United States Patent
Vavilapalli et al.

(10) Patent No.: US 12,417,176 B2
(45) Date of Patent: *Sep. 16, 2025

(54) PERSISTENT KEY-VALUE STORE AND JOURNALING SYSTEM

(71) Applicant: NetApp, Inc., San Jose, CA (US)

(72) Inventors: Sudheer Kumar Vavilapalli, San Jose, CA (US); Asif Imtiyaz Pathan, San Jose, CA (US); Parag Sarfare, San Jose, CA (US); Nikhil Mattankot, Pleasanton, CA (US); Stephen Wu, Sacramento, CA (US); Amit Borase, San Mateo, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,014

(22) Filed: Mar. 25, 2024

(65) Prior Publication Data

US 2024/0232080 A1    Jul. 11, 2024

Related U.S. Application Data

(63) Continuation of application No. 17/553,930, filed on Dec. 17, 2021, now Pat. No. 11,940,911.

(51) Int. Cl.
G06F 12/0802    (2016.01)
G06F 3/06    (2006.01)

(52) U.S. Cl.
CPC ........ *G06F 12/0802* (2013.01); *G06F 3/0619* (2013.01); *G06F 3/0653* (2013.01); *G06F 3/0673* (2013.01); *G06F 2212/60* (2013.01)

(58) Field of Classification Search
None
See application file for complete search history.

(56) References Cited

U.S. PATENT DOCUMENTS 5,664,187 A    9/1997    Burkes et al.
6,101,615 A    8/2000    Lyons
(Continued)

FOREIGN PATENT DOCUMENTS

EP    1343087 A2    9/2003

OTHER PUBLICATIONS

Non-Final Office Action mailed on Apr. 28, 2023 for U.S. Appl. No. 17/553,930, filed Dec. 17, 2021, 24 pages.
(Continued)

*Primary Examiner* — Jared I Rutz
*Assistant Examiner* — Alexander J Yoon
(74) *Attorney, Agent, or Firm* — Cooper Legal Group, LLC

(57) ABSTRACT

Techniques are provided for implementing a persistent key-value store for caching client data, journaling, and/or crash recovery. The persistent key-value store may be hosted as a primary cache that provides read and write access to key-value record pairs stored within the persistent key-value store. The key-value record pairs are stored within multiple chains in the persistent key-value store. Journaling is provided for the persistent key-value store such that incoming key-value record pairs are stored within active chains, and data within frozen chains is written in a distributed manner across distributed storage of a distributed cluster of nodes. If there is a failure within the distributed cluster of nodes, then the persistent key-value store may be reconstructed and used for crash recovery.

20 Claims, 11 Drawing Sheets

(56) References Cited

U.S. PATENT DOCUMENTS

| | | |
|---|---|---|
| 8,074,021 B1 | 12/2011 | Miller et al. |
| 8,463,991 B2 | 6/2013 | Colgrove et al. |
| 8,549,222 B1 | 10/2013 | Kleiman et al. |
| 8,775,868 B2 | 7/2014 | Colgrove et al. |
| 8,832,373 B2 | 9/2014 | Colgrove et al. |
| 8,850,108 B1 | 9/2014 | Hayes et al. |
| 8,862,820 B2 | 10/2014 | Colgrove et al. |
| 9,003,144 B1 | 4/2015 | Hayes et al. |
| 9,021,297 B1 | 4/2015 | Hayes et al. |
| 9,134,917 B2 | 9/2015 | Kimmel et al. |
| 9,201,600 B1 | 12/2015 | Hayes et al. |
| 9,218,244 B1 | 12/2015 | Hayes et al. |
| 9,229,808 B2 | 1/2016 | Colgrove et al. |
| 9,244,769 B2 | 1/2016 | Colgrove et al. |
| 9,298,604 B2 | 3/2016 | Sengupta et al. |
| 9,367,243 B1 | 6/2016 | Hayes et al. |
| 9,483,346 B2 | 11/2016 | Davis et al. |
| 9,495,255 B2 | 11/2016 | Davis et al. |
| 9,525,738 B2 | 12/2016 | Hayes et al. |
| 9,563,506 B2 | 2/2017 | Hayes et al. |
| 9,588,842 B1 | 3/2017 | Sanvido et al. |
| 9,594,633 B2 | 3/2017 | Colgrove et al. |
| 9,672,125 B2 | 6/2017 | Botes et al. |
| 9,672,905 B1 | 6/2017 | Gold et al. |
| 9,798,477 B2 | 10/2017 | Botes et al. |
| 9,880,899 B2 | 1/2018 | Davis et al. |
| 9,934,089 B2 | 4/2018 | Hayes et al. |
| 9,967,342 B2 | 5/2018 | Colgrove et al. |
| 10,180,879 B1 | 1/2019 | Colgrove et al. |
| 10,182,096 B1 | 1/2019 | Siddiqi et al. |
| 10,248,516 B1 | 4/2019 | Sanvido et al. |
| 10,303,547 B2 | 5/2019 | Hayes et al. |
| 10,353,777 B2 | 7/2019 | Bernat et al. |
| 10,372,506 B2 | 8/2019 | Baptist et al. |
| 10,379,763 B2 | 8/2019 | Colgrove et al. |
| 10,387,247 B2 | 8/2019 | Baptist et al. |
| 10,387,250 B2 | 8/2019 | Resch et al. |
| 10,387,256 B2 | 8/2019 | Dhuse et al. |
| 10,402,266 B1 | 9/2019 | Kirkpatrick et al. |
| 10,417,092 B2 | 9/2019 | Brennan et al. |
| 10,432,233 B1 | 10/2019 | Colgrove et al. |
| 10,437,673 B2 | 10/2019 | Baptist et al. |
| 10,437,678 B2 | 10/2019 | Resch |
| 10,452,289 B1 | 10/2019 | Colgrove et al. |
| 10,467,107 B1 | 11/2019 | Abrol et al. |
| 10,489,256 B2 | 11/2019 | Hayes et al. |
| 10,503,598 B2 | 12/2019 | Trichardt et al. |
| 10,521,120 B1 | 12/2019 | Miller et al. |
| 10,530,862 B2 | 1/2020 | Isely et al. |
| 10,534,661 B2 | 1/2020 | Resch |
| 10,572,176 B2 | 2/2020 | Davis et al. |
| 10,579,450 B2 | 3/2020 | Khadiwala et al. |
| 10,606,700 B2 | 3/2020 | Alnafoosi et al. |
| 10,613,974 B2 | 4/2020 | Dreier et al. |
| 10,656,871 B2 | 5/2020 | Peake |
| 10,657,000 B2 | 5/2020 | Resch |
| 10,671,480 B2 | 6/2020 | Hayes et al. |
| RE48,222 E | 9/2020 | Colgrove et al. |
| 10,776,204 B2 | 9/2020 | Resch et al. |
| 10,810,083 B1 | 10/2020 | Colgrove et al. |
| 10,817,375 B2 | 10/2020 | Colgrove et al. |
| 10,838,834 B1 | 11/2020 | Sanvido et al. |
| 10,852,978 B2 | 12/2020 | Kurichiyath et al. |
| 10,860,424 B1 | 12/2020 | Dhuse et al. |
| 10,891,192 B1 | 1/2021 | Brennan et al. |
| RE48,448 E | 2/2021 | Colgrove et al. |
| 11,061,603 B1 | 7/2021 | Bankar et al. |
| 11,231,867 B1* | 1/2022 | Ippatapu .............. G06F 3/0659 |
| 11,940,911 B2 | 3/2024 | Vavilapalli et al. |
| 2012/0084506 A1 | 4/2012 | Colgrove et al. |
| 2014/0047263 A1 | 2/2014 | Coatney et al. |
| 2016/0342470 A1 | 11/2016 | Cudak et al. |
| 2017/0078387 A1 | 3/2017 | Xu et al. |
| 2018/0260324 A1 | 9/2018 | Marathe et al. |
| 2019/0007206 A1 | 1/2019 | Surla et al. |
| 2019/0042571 A1 | 2/2019 | Li et al. |
| 2019/0361626 A1* | 11/2019 | East .................. G06F 3/0629 |
| 2020/0394112 A1 | 12/2020 | Gupta et al. |
| 2020/0409601 A1 | 12/2020 | Helmick et al. |
| 2021/0081273 A1 | 3/2021 | Helmick et al. |
| 2021/0132827 A1 | 5/2021 | Helmick et al. |
| 2021/0216220 A1 | 7/2021 | Kim et al. |
| 2021/0271667 A1* | 9/2021 | Cohen ................. H04L 9/3297 |
| 2023/0195622 A1 | 6/2023 | Vavilapalli et al. |

OTHER PUBLICATIONS

Notice of Allowance mailed on Feb. 26, 2024 for U.S. Appl. No. 17/553,930, filed Dec. 17, 2021, 02 pages.

Notice of Allowance mailed on Nov. 13, 2023 for U.S. Appl. No. 17/553,930, filed Dec. 17, 2021, 12 pages.

Conrad J., "What is Container Orchestration? Definition, Key Benefits, and Tools," Cloud, Aug. 2020, Capital One, Retrieved from the Internet at: https://www.capitalone.com/tech/cloud/what-is-container-orchestration/, 10 pages.

"Data Services for Database Containers Stateful Containers," Portworx, Dec. 2021, Retrieved from the Internet at: https://portworx.com/products/portworx-enterprise/, 10 pages.

Dholakia A., et al., "A New Intra-disk Redundancy Scheme for High-Reliability RAID Storage Systems in the Presence of Unrecoverable Errors," ACM Transactions on Storage, May 2008, vol. 4 (1), Article 1,42 pages.

Docker vs Virtual Machines (VMs): A Practical Guide to Docker Containers and VMs [online]. Jan. 16, 2020. Weaveworks, 2021, 8 pages, [retrieved on Nov. 9, 2021]. Retrieved from the Internet: https://www.weave.works/blog/a-practical-guide-to-choosing-between-docker-containers-and-vms.

European Search Report for Application No. EP22157793 mailed on Jul. 19, 2022, 16 pages.

"How to Build a Containers a a Service Platform in Kubernetes," 2021, Portworx, Retrieved from the Internet at: https://portworx.com/containers-as-a-service/, 7 pages.

Hurley C., et al., "FlexCache in Ontap," Ontap 9.11.1, Aug. 2022, 46 pages.

Joshi A., "From there to here, from here to there, Containers are Everywhere!," Dec. 16, 2020 [online], Nutanix. Dev, 2021, 14 pages. [Retrieved on Nov. 9, 2021], Retrieved from the Internet: URL: https://www.nutanix.dev/2020/12/16/from-there-to-here-from-here-to-there-containers-are-everywhere/.

Kadekodi R., et al., "WineFS: A Hugepage-aware File System for Persistent Memory that Ages Gracefully," SOSP Virtual Event, 2021, pp. 804-818.

Karbon., "Kubernetes Management Solutions for Enterprise," Management Made Simple, 2021, Nutanix, Retrieved from the Internet at: https://www.nutanix.com/products/karbon, 12 pages.

Kralj M., "How to Orchestrate the Modern Cloud with Kubernetes," Jul. 2020, Software Engineering Blog, Retrieved from the Internet at: https://www.accenture.com/us-en/blogs/software-engineering-blog/kralj-orchestrate-modern-cloud-kubernetes, 7 pages.

Kubernetes., "Production-Grade Container Orchestration," 2021, 6 pages. Retrieved from the Internet: [https://kubernetes.io/].

"List of Top Software Defined Storage (SDS) Solutions 2021," Software Defined Storage (SDS) Solutions, Swouter Zijlstro, Retrieved from the Internet at: https://www.trustradius.com/software-defined-storage-sds, 17 pages.

Mao B., et al., "HPDA: A Hybrid Parity-Based Disk Array for Enhanced Performance and Reliability," Retrieved from Internet URL: https://www.researchgate.net/publication/224140602, May 2020; 13 pages.

Mathenge J., "Containers vs Microservices: What's the Difference?," Jul. 2021, bmc Software/Slogs, Retrieved from the Internet at: https://www.bmc.com/blogs/containers-vs-microservices/, 19 pages.

Netapp, Inc., "Data ONTAP7 .3 Data Protection Online Backup and Recovery Guide," Feb. 22, 2011, Part No. 210-05212_A0, 432 pages.

Netapp, Inc., "Data ONTAP@7.3 Active/Active Configuration Guide," Jun. 16, 2011, Part No. 210-05247_A0, 214 pages.

(56) References Cited

OTHER PUBLICATIONS

Netapp, Inc., "Data ONTAP7.3 Archive and Compliance Management Guide," Mar. 4, 2010, Part No. 210-04827_A0, 180 pages.
Netapp, Inc., "Data ONTAP7.3 Block Access Management Guide for iSCSI and FC," Mar. 4, 2010, Part No. 210-04752_B0, 202 pages.
Netapp, Inc., "Data ONTAP7.3 Data Protection Tape Backup and Recovery Guide," Jan. 15, 2010, Part No. 210-04762_A0, 142 pages.
Netapp, Inc., "Data ONTAP7.3 Documentation Roadmap," Jul. 9, 2008, Part No. 210-04229_A0, 8 pages.
Netapp, Inc., "Data ONTAP7.3 File Access and Protocols Management Guide," Sep. 10, 2009, Part No. 210-04505_B0, 382 pages.
Netapp, Inc., "Data ONTAP7.3 MultiStore Management Guide," Mar. 4, 2010, Part No. 210-04855_A0, 144 pages.
Netapp, Inc., "Data ONTAP7.3 Network Management Guide," Jan. 15, 2010, Part No. 210-04757_A0, 222 pages.
Netapp, Inc., "Data ONTAP7.3 Software Setup Guide," Nov. 4, 2010, Part No. 210-05045_A0, 116 pages.
Netapp, Inc., "Data ONTAP7.3 Storage Efficiency Management Guide," Mar. 4, 2010, Part No. 210-04856_A0, 76 pages.
Netapp, Inc., "Data ONTAP7.3 Storage Management Guide," May 3, 2012, Part No. 210-04766_B0, 356 pages.
Netapp, Inc., "Data ONTAP7.3 System Administration Guide," Nov. 11, 2010, Part No. 210-05043_A0, 350 pages.
Netapp, Inc., "Data ONTAP7.3 Upgrade Guide," Nov. 11, 2010, Part No. 210-05042_A0, 200 pages.
Netapp, Inc., "Data ONTAP7.3.7 Release Notes," May 31, 2012, Part No. 215-06916_A0, 182 pages.
Netapp, Inc., "Date ONTAP7.3 Core Commands Quick Reference," Jun. 2008, Part No. 215-03893 A0, 1 page.
Netapp, Inc., "Notices," 2010, Part No. 215-05705_A0, 46 pages.
Netapp, Inc., "V-Series Systems Hardware Maintenance Guide," Jul. 2006, Part No. 210-00975_A0, 202 pages.
Netapp, Inc., "V-Series Systems Implementation Guide for Hitachi Storage," Dec. 2009, Part No. 210-04694_A0, 66 pages.
Netapp, Inc., "V-Series Systems Installation Requirements and Reference Guide," Oct. 2010, Part No. 210-05064_A0, 214 pages.
Netapp, Inc., "V-Series Systems MetroCluster Guide," Jul. 2009, Part No. 210-04515_A0, 80 pages.
What Is Container Orchestration, Exactly? Everything to Know [online], LaunchDarkly, Apr. 28, 2021, 8 pages. [retrieved on Nov. 9, 2021]. Retrieved from the Internet: https://launchdarkly.com/blog/what-is-container-orchestration-exactly-everything/.
Notice of Allowance for Co-pending U.S. Appl. No. 17/192,606, dated Jan. 28, 2022.
Solution Brief. Easily Operate a Database-as-a-Service Platform, [online], Portworx, Inc. 2021, 2 pages [retrieved on Nov. 9, 2021]. Retrieved from the Internet: https://portworx.com/wp-content/uploads/2021/09/pds-solution-brief.pdf.
Sanglaji M., et al., "Nutanix Karbon: Enterprise-grade Kubernetes Solution," Nov. 28, 2018, 5 pages [online] [retrieved on Nov. 9, 2021]. Retrieved from the Internet: https://www.nutanix.com/blog/nutanix-karbon-enterprise-grade-kubernetes-solution.
Nutanix Karbon, Enterprise Kubernetes Made Simple, Datasheet, 2019, Nutanix Inc, 2 pages.
NVM Express Workgroup "NVM Express Base Specification," Mar. 9, 2020, Revision 1.4a, 405 pages.
"Software-Defined Storage (SDS) Solutions," 2021, IBM, Reprinted from the Internet at: https://www.ibm.com/storage/software-defined-storage, 15 pages.
Pods [online]. Kubernetes, 2021, 6 pages [retrieved on Nov. 9, 2021]. Retrieved from the Internet: https://kubernetes.io/docs/concepts/workloads/pods/.
Portworx Data Services, the Complete Solution for Deploying Production-Grade Data Services on Kubernetes. [online]. Portworx, Inc. 2021,5 pages. [Retrieved on Nov. 9, 2021]. Retrieved from the Internet: https://portworx.com/products/portworx-data-services/.
Rao G., "Container Storage Architectures: Which is Right for you?," Dec. 2016, Portworx, Retrieved from the Internet at: https://portworx.com/blog/stateful-enterprise-applications-docker/, 5 pages.
REDIS., "Achieve Data Persistence Storage with Durable Redis," Redis Cloud receives PCI DSS Certification, 9 pages.

\* cited by examiner

PERSISTENT KEY-VALUE STORE AND JOURNALING SYSTEM

RELATED APPLICATIONS

This application claims priority to and is a continuation of U.S. application Ser. No. 17/553,930, filed on Dec. 17, 2021, now allowed, titled "PERSISTENT KEY-VALUE STORE AND JOURNALING SYSTEM," which is incorporated herein by reference.

TECHNICAL FIELD

Various embodiments of the present technology generally relate to managing data using a distributed file system. More specifically, some embodiments relate to methods and systems for managing data using a distributed file system that utilizes persistent key-value store for caching client data, journaling, and/or crash recovery.

BACKGROUND

Historically, developers built inflexible, monolithic applications designed to be run on a single platform. However, building a monolithic application is no longer desirable in most instances as many modern applications often need to efficiently, and securely, scale (potentially across multiple platforms) based on demand. There are many options for developing scalable, modern applications. Examples include, but are not limited to, virtual machines, microservices, and containers. The choice often depends on a variety of factors such as the type of workload, available ecosystem resources, need for automated scaling, and/or execution preferences.

When developers select a containerized approach for creating scalable applications, portions (e.g., microservices, larger services, etc.) of the application are packaged into containers. Each container may comprise software code, binaries, system libraries, dependencies, system tools, and/or any other components or settings needed to execute the application. In this way, the container is a self-contained execution enclosure for executing that portion of the application.

Unlike virtual machines, containers do not include operating system images. Instead, containers ride on a host operating system which is often light weight allowing for faster boot and utilization of less memory than a virtual machine. The containers can be individually replicated and scaled to accommodate demand. Management of the container (e.g., scaling, deployment, upgrading, health monitoring, etc.) is often automated by a container orchestration platform (e.g., Kubernetes).

The container orchestration platform can deploy containers on nodes (e.g., a virtual machine, physical hardware, etc.) that have allocated compute resources (e.g., processor, memory, etc.) for executing applications hosted within containers. Applications (or processes) hosted within multiple containers may interact with one another and cooperate together. For example, a storage application within a container may access a deduplication application and a compression application within other containers in order deduplicate and/or compress data managed by the storage application. Container orchestration platforms often offer the ability to support these cooperating applications (or processes) as a grouping (e.g., in Kubernetes this is referred to as a pod). This grouping (e.g., a pod) can supports multiple containers and forms a cohesive unit of service for the applications (or services) hosted within the containers. Containers that are part of a pod may be co-located and scheduled on a same node, such as the same physical hardware or virtual machine. This allows the containers to share resources and dependencies, communicate with one another, and/or coordinate their lifecycles of how and when the containers are terminated.

SUMMARY

Various embodiments of the present technology generally relate to managing data using a distributed file system. More specifically, some embodiments relate to methods and systems for managing data using a distributed file system that utilizes persistent key-value store for caching client data, journaling, and/or crash recovery.

In some embodiments, a system is provided. The system comprises a node of a distributed cluster of nodes hosted within a container orchestration platform. The node is configured to store data across distributed storage managed by the distributed cluster of nodes. The system comprises a persistent key-value store hosted as a primary cache for the node. The data is cached as key-value record pairs within the primary cache for read and write access until written in a distributed manner across the distributed storage. The node comprises a storage management system configured to store the key-value record pairs within multiple chains within the persistent key-value store. A chain includes an operation header bucket for recording key entries of key records and metadata of the key records, a data bucket for recording value entries of value records, and a meta bucket for recording bucket chain metadata pointing to the operation header bucket that points to the data bucket. In response to receiving a key-value record pair to cache within the primary cache, a two phase commit process is performed. The two phase commit process includes a first phase to record a value record of the key-value record pair as a value entry within a chain and a second phase, performed subsequent the first phase, to record a key record of the key-value record pair as a key entry within the chain.

In some embodiments, the system comprises a non-volatile random access memory (NVRAM) configured to store the persistent key-value store as the primary cache and a non-volatile log (NVlog). The NVlog is used by a storage operating system to log write operations before being stored to storage.

In some embodiments, the storage management system is configured to assign a prefix to the value entry and the key entry. The prefix includes at least one of a serial number of an operation that created the key-value record pair, a checksum, or a consistency point count of a consistency point that included the operation. A validation for the key-value record pair is performed by determining whether prefixes of the value entry and the key entry match.

In some embodiments, the storage management system is configured to assign global virtual write index values to the key-value record pairs. The global virtual write index values are global sequentially incrementing record numbers for PUT operations associated with the key-value record pairs. A validation for the chains within the persistent key-value store is performed by determining whether there are missing global virtual write index values.

In some embodiments, the storage management system is configured to monitor the distributed cluster of nodes to detect whether a failure has occurred. The storage management system detects the failure associated with the distributed cluster of nodes. In response to the storage management system detecting the failure associated with the distributed cluster of nodes, a journal recovery process is performed to rebuild the chains of the persistent key-value store in parallel.

In some embodiments, the storage management system is configured to detect a failure associated with the distributed cluster of nodes. In response to detecting the failure associated with the distributed cluster of nodes, a journal recovery process is performed to rebuild the chains of the persistent key-value store according to an order of which operations associated with the key-value record pairs were executed.

In some embodiments, the storage management system is configured to utilize a key-value map data structure, associating keys and values with corresponding key-value metadata, to identify corresponding key-value metadata associated with the key-value record pair. Indexing information within the corresponding key-value metadata is used to identify virtual addresses for accessing the key record and the value record within storage.

In some embodiments, the storage management system is configured to perform, by a first processor, a first operation upon a first key-value record pair within a first chain. A second processor performs a second operation upon a second key-value record pair within a second chain. The first operation and the second operation are performed concurrently without locking based upon the first operation and the second operation targeting different chains.

In some embodiments, the storage management system is configured to execute PUT operations upon active chains within the persistent key-value store. GET operations are performed upon the active chains and frozen chains within the persistent key-value store. In response to an active chain reaching a threshold size or a consistency point being reached, the active chain is frozen as a frozen chain and persist data within the frozen chain across the distributed storage.

In some embodiments, the storage management system is configured to determine whether an active chain has reached a threshold size or a consistency point being reached. In response to the active chain reaching the threshold size or the consistency point being reached, the active chain is frozen as a frozen chain and persist data within the frozen chain across the distributed storage. In response to the data being persisted across the distributed storage, a frozen operation header bucket, a frozen meta bucket, and a frozen data bucket of the frozen chain are freed.

In some embodiments, the storage management system is configured to detect a failure associated with the distributed cluster of nodes. In response to detecting a failure associated with the distributed cluster of nodes, a key-value map data structure associating keys and values with corresponding key-value metadata of indexing information is rebuilt.

In some embodiments, the persistent key-value store and a non-volatile log (NVlog) are stored within a non-volatile random access memory (NVRAM). The system comprises space management functionality configured to provide the NVlog with metrics associated with NVRAM utilization by the persistent key-value store. The metrics are used to determine when to store data from the NVlog to storage. The persistent key-value store is provided with metrics associated with NVRAM utilization by the NVlog.

In some embodiments, the storage management system is configured to detecting a failure associated with the distributed cluster of nodes. In response to detecting the failure associated with the distributed cluster of nodes, a journal recovery process is performed to rebuild active chains of the persistent key-value store according to an order of which operations associated with the key-value record pairs were executed and to rebuild frozen chains in any order. An active chain is available to store new key-value record pairs. A frozen chain is no longer available to store new key-value record pairs and key-value record pairs within the frozen chain set to be distributed to the distributed storage.

In some embodiments, the storage management system is configured to store key-value pairs for a first service within a first set of chains and key-value pairs for a second service within a second set of chains. In response to detecting a failure associated with the distributed cluster of nodes, the first set of chains for the first service and the second set of chains for the second service are independently recovered.

In some embodiments, a method is provided. The method includes caching data as key-value record pairs in multiple chains within a persistent key-value store configured as a primary cache for a node of a distributed cluster of nodes hosted within a container orchestration platform, wherein a chain includes an operation header bucket for recording key entries of key records and metadata of the key records, a data bucket for recording value entries of value records, and a meta bucket for recording bucket chain metadata pointing to the operation header bucket that points to the data bucket. The method includes providing read and write access to the data within the primary cache until written in a distributed manner across the distributed storage. The method includes detecting a failure associated with the distributed cluster of nodes. In response to detecting the failure associated with the distributed cluster of nodes, a journal recovery process is performed to rebuild the chains of the persistent key-value store in parallel.

In some embodiments, performing the journal recovery process comprises rebuilding the chains of the persistent key-value store according to an order of which operations associated with the key-value record pairs were executed.

In some embodiments, performing the journal recovery process comprises rebuilding a key-value map data structure associating keys and values with corresponding key-value metadata of indexing information.

In some embodiments, a non-transitory machine readable medium is provided. The non-transitory machine readable medium comprises instructions that cause a machine to cache data as key-value record pairs in multiple chains within a persistent key-value store configured as a primary cache for a node of a distributed cluster of nodes hosted within a container orchestration platform. A chain includes an operation header bucket for recording key entries of key records and metadata of the key records, a data bucket for recording value entries of value records, and a meta bucket for recording bucket chain metadata pointing to the operation header bucket that points to the data bucket. The instructions cause the machine to assign a prefix to a value entry and a key entry of a key-value record pair stored within the persistent key-value store. The prefix includes at least one of a serial number of an operation that created the key-value record pair, a checksum, or a consistency point count of a consistency point that included the operation. The instructions cause the machine to perform a validation for the key-value record pair by determining whether prefixes read from the value entry and the key entry match.

In some embodiments, the instructions cause the machine to assign global virtual write index values to the key-value record pairs. The global virtual write index values are global sequentially incrementing record numbers for PUT operations associated with the key-value record pairs. The instructions cause the machine to perform a validation for the chains within the persistent key-value store by determining whether there are missing global virtual write index values.

In some embodiments, the instructions cause the machine to utilize a backing storage device for storing the persistent key-value store and a non-volatile log (NVlog). In response to a latency of the backing storage device being below a threshold, a sync DMA transfer mode is implemented for storing data to the persistent key-value store and the NVlog. In response to a latency of the backing storage device being exceeding the threshold, an async DMA transfer mode is implemented for storing data to the persistent key-value store and the NVlog.

DESCRIPTION OF THE DRAWINGS

Embodiments of the present technology will be described and explained through the use of the accompanying drawings in which.

Figure 1A:
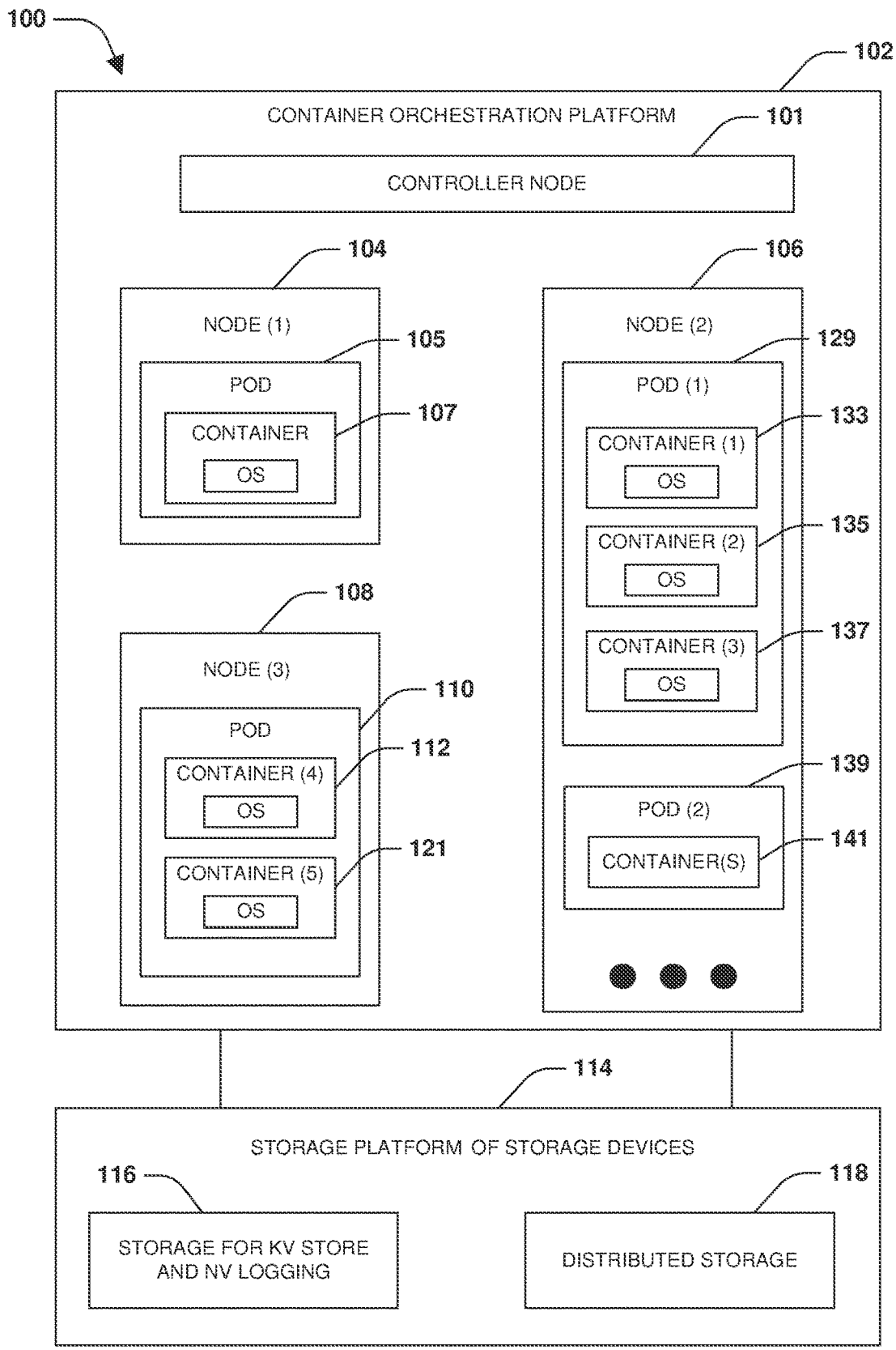
FIG. 1A is a block diagram illustrating an example of various components of a composable, service-based distributed storage architecture in accordance with various embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The techniques described herein are directed to implementing a persistent key-value store for caching client data, journaling, and/or crash recovery for a distributed storage architecture while serving read/write I/O using the persistent key-value store. The demands on data center infrastructure and storage are changing as more and more data centers are transforming into private and hybrid clouds. Storage solution customers are looking for solutions that can provide automated deployment and lifecycle management, scaling on-demand, higher levels of resiliency with increased scale, and automatic failure detection and self-healing. To meet these objectives, a container-based distributed storage architecture can be leveraged to create a composable, service-based architecture that provides scalability, resiliency, and load balancing. The distributed storage management system may include one or more clusters and a distributed file system that is implemented for each cluster or across the one or more clusters. The distributed file system may provide a scalable, resilient, software defined architecture that can be leveraged to be the data plane for existing as well as new web scale applications.

When a client stores data on the distributed storage architecture, the data may be distributed across storage hosted by any number of nodes of the distributed storage architecture in a distributed manner. Providing applications with read and write access to the data distributed across the distributed storage may introduce latency and provide suboptimal performance for the applications. That is, the data may be distributed across multiple storage devices located at different nodes within the distributed storage architecture. When the application issues a request for data residing at multiple storage devices, then the data must be retrieved from each of the storage devices. Retrieving the data from multiple storage devices located at different nodes may involve multiple network hops within the distributed storage architecture. This introduces additional latency for the application, thus reducing performance of the application compared to if all the data was available from storage local to a node processing the request from the application.

In some traditional solutions, latency and performance might be improved by hosting a cache within the storage management system using relatively fast storage such as non-volatile random-access memory (NVRAM). The data may be cached within the NVRAM through a volume used to host the cache. Unfortunately, using the volume to host the cache may not be optimal because the data is first recorded within the NVRAM, and is then moved to storage (e.g., RAID/storage) through a consistency point that moves (flushes) data from the NVRAM to storage of the node, which may not be the final destination of the data. In particular, the final destination of the data may be located elsewhere in the distributed storage (e.g., at storage of the distributed storage that is located at a different node) than where the consistency point stored the data to the storage of the node hosting the cache. Thus, using the volume to host the cache is not performant because of how much the data must be moved around between the NVRAM, storage of the node, and to the final destination in the distributed storage.

In contrast, various embodiments of the present technology utilize a persistent key-value store as a data storage paradigm and storage format/structure backing a primary cache for a node of the distributed storage architecture. That is, the primary cache is backed by the persistent key-value store such that cached data of the primary cache is organized and stored as key-value pairs by the persistent key-value store. The persistent key-value store may be hosted on relatively fast storage media (e.g., NVRAM, flash, 3D Xpoint, NVDIMM, etc.) for low latency access of cached data. In some embodiments, the data is stored as key-value record pairs that can be quickly stored and retrieved from the persistent key-value store.

A key-value record pair comprises a value record (e.g., actual data such as client data being stored) and a key record (e.g., a unique identifier such as a hash of the value record) used to reference the value record. In this way, the key record may be used to quickly locate the value record within the persistent key-value store. Instances of the persistent key-value store may be implemented as primary caches for containers managed by a container orchestration platform of the distributed storage architecture. These containers may be scaled up or down on-demand based upon current load, and thus the instances of the primary caches (hosted by the persistent key-value store) may scale up or down with the containers as each container will have its own primary cache.

The key-value record pairs can be resident within the persistent key-value store until data of the key-value record pairs is to be written to the distributed storage as a final destination. This reduces write amplification because the data is directly written from the persistent key-value store to the final destination within the distributed storage as opposed to being stored from the cache to an intermediate storage location that may not be the final destination. Moreover, because the persistent key-value store is a persistent tier, the persistent key-value store does not rely upon a file system to offload data for long term storage. This additionally reduces write amplification that would have been incurred from writing cached content from the cache to the volume using a non-volatile log (NVlog) of the file system, and then again from the volume to long term storage through a consistency point. Additionally, read operations can be locally served from the persistent key-value store, which avoids network hops to remote storage locations of the distributed storage that would otherwise introduce additional latency.

The distributed storage architecture can include a data management system and a storage management system. The data management system is a client facing frontend with which clients interact, such as where I/O operations from the clients are received. The storage management system is a distributed backend (e.g., instances of the storage management system may be distributed amongst multiple nodes of the distributed storage architecture) used to store data on storage devices of a storage platform. When the data management system of the distributed storage architecture receives a write operation to write data, a key-value record pair is created. The key-value record includes a value record comprising the data and a key record comprising an identifier of the data (e.g., a hash of the data). The key-value record pair is persisted within the persistent key-value store in order to cache the data being written by the write operation. For example, as part of persisting the key-value pair, the data management system may transmit the key-value record pair to a storage management system within which the persistent key-value store resides. The storage management system may then store the key-value record pair within the persistent key-value store.

As part of processing write operations received from the data management system, the persistent key-value store within the storage management system may generate a unique global virtual write index value (NVWI) for every write operation. In some embodiments, NVWIs may be globally unique (e.g., unique across chains of key-value record pairs in the persistent key-value store) monotonically increasing numbers that are unique for each key-value record pair (e.g., a first write operation may be assigned an NVWI of "1," a second write operation may be assigned an NVWI of "2," etc.). In some embodiments, a hash function (e.g., a Secure Hash Algorithm (SHA)-1, SHA-256, SHA-512,) may be used to generate NVWIs as globally unique values for each key-value record pair created by write operations.

The hash function may take data of the write operation as an input, and may output a hash value that is derived from and unique to the data of the write operation (e.g., SHA-1 may output 5F45DF1B6C28A11FF3CBD2991BA977964DBB6D8A based upon a write operation writing "Document 123" to a file). In this way, the NVWI for every write operation may be unique to the data of write operations. In some embodiments, the NVWI is used as a key for any further operations such as read operations and delete operations to the key-value record pair. The value of the key-value record pair may comprise a data payload of the write operation, such as a compressed data payload.

Key-value record pairs may be stored within chains. A chain may comprise a data structure that includes multiple buckets used to store key records and value records of key-value record pairs that are stored within the persistent key-value store. In some embodiments, the chain may comprise a meta bucket, an operation header bucket, and a data bucket. The meta bucket may comprise bucket chain metadata such as a pointer that points to the operation header bucket. Key records are stored within the operation header bucket, and value records are stored within the data bucket. In this way, value records and key records of key-value record pairs may be stored within the operation header bucket and the data bucket of the chain. In some embodiments, the meta bucket may be optional, and thus key records are stored in the operation header bucket and value records are stored in the data bucket. In some embodiments, a chain may behave a single data structure, such as a single bucket, for storing key-value record pairs.

Read operations and lookup operations from clients for keys and values may be accelerated using in-core mapping data structures (e.g., a key-value map data structure stored in-core within memory as opposed to on a storage disk) for keys and corresponding value locations. Write operations update these in-core mapping structures to add new keys and values, and corresponding delete operations may remove existing keys and values from the in-core mapping structures. The delete operations may be executed in a batch to remove an entire chain of key records and value records in a single operation, which may avoid fragmentation from granular bucket reclamation that would remove individual buckets of the chain one at a time (e.g., removal of a meta bucket, then removal of a data bucket for a value record, and finally removal of an operational header bucket for a key record).

Write operations targeting the persistent key-value store are performed according to a particular ordering to ensure correctness. To achieve this ordering, an operation is not considered persistent until both data (e.g., a value record comprising client data) and metadata (e.g., indexing information, such as virtual addresses, used to locate key records and value records in underlying storage media) in the persistent key-value store are persisted. That is, an operation to cache data may be implemented as a data write operation to write a value record comprising the data being cached and a metadata write operation to store indexing information used to locate the value record.

As part of ordering the data write operation and the metadata write operation to ensure correctness, the metadata write operation to store the metadata is not performed until successful completion of the data write operation to store the data. This ensures that there is not an instance where the metadata referencing the data has been persisted, but a failure occurs before the data has been persisted, thus leaving a reference to non-existent data. That is, if the metadata write operation is performed first to create a reference to the data and a failure occurs before the data write operation is performed, then there is a reference to non-existing data. This ordering may be achieved by a multi-phase (e.g., two-phase) commit process that has a first phase to persist the data and a subsequent second phase to persist the metadata.

In addition to using the persistent key-value store as a primary cache and/or for journaling, the persistent key-value store may be implemented for crash recovery. In response to a crash occurring (e.g., the node crashes), file system internal operations and operations recorded within the persistent key-value store by the primary cache may be recovered. A file system NVlog replay may be performed such as to recover the file system internal operations. The NVlog replay may preserve file system object properties such as inode numbers and file handles.

A persistent key-value store replay may also be performed. If there is no volume that has content recorded in both the NVlog and the persistent key-value store, then the persistent key-value store replay may be performed during the NVlog replay. Otherwise, the persistent key-value store replay is performed after the NVlog replay. As part of the persistent key-value store replay, the key-value map data structure may be constructed while building and verifying key-value records. Various verification checks can be performed using information stored with the key-value record pairs, such as checksums, serial numbers, consistency point counts, NVWIs, etc. Chains of key-value record pairs may be rebuilt in parallel and according to an order with which operations associated with the key-value record pairs were performed. This improves the performance of crash recovery and provides the ability to recover to a consistent state.

Various embodiments of the present technology provide for a wide range of technical effects, advantages, and/or improvements to computing systems and components. For example, various embodiments may include one or more of the following technical effects, advantages, and/or improvements: 1) implementation of a persistent key-value store as a primary cache to reduce write amplification and improve performance compared to other types of caches; 2) use of non-routine and unconventional operations to persist key-value records into the persistent key-value store using a multi-phase (e.g., two phase) commit process that provides strict order and atomicity guarantees so that the persistent key-value store may be rebuilt into a consistent state after a crash; 3) use of non-routine and unconventional operations to recover from a crash by rebuilding chains of key-value record pairs for the persistent key-value store, such as where multiple chains can rebuilt during overlapping timespans in order to improve the efficiency of rebuilding the persistent key-value store, as opposed to serially where merely a single chain is rebuilt at a time; 4) use of non-routine and unconventional operations to recover from a crash by rebuilding the chains of key-value record pairs for the persistent key-value store according to an order of which operations associated with the key-value record pairs were performed in order to ensure the rebuilt chains in the persistent key-value store are consistent; 5) executing operations using different CPUs upon different chains of key-value record pairs using a multi-threaded approach for improved performance; and/or 6) performing various granularities of verifications to ensure that the persistent key-value store is valid and resilient, such as by verifying a single record entry, verifying a chain, performing a cross-chain verification, etc.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to a distributed storage architecture and container orchestration platform (e.g., Kubernetes), embodiments of the present technology are equally applicable to various other computing environments such as, but not limited to, a virtual machine (e.g., a virtual machine hosted by a computing device with persistent storage such as NVRAM accessible to the virtual machine for storing a persistent key-value store), a server, a node, a cluster of nodes, etc.

The techniques introduced here can be embodied as special-purpose hardware (e.g., circuitry), as programmable circuitry appropriately programmed with software and/or firmware, or as a combination of special-purpose and programmable circuitry. Hence, embodiments may include a computer-readable medium or machine readable-medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to various embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1A illustrates various components of a composable, service-based distributed storage architecture 100. In some embodiments, the distributed storage architecture 100 may be implemented through a container orchestration platform 102 or other containerized environment, as illustrated by FIG. 1A. A container orchestration platform can automate storage application deployment, scaling, and management. One example of a container orchestration platform is Kubernetes. Core components of the container orchestration platform 102 may be deployed on one or more controller nodes, such as controller node 101.

The controller node 101 may be responsible for managing the overall distributed storage architecture 100, and may run various components of the container orchestration platform 102 such as an API server that implements the overall control logic, a scheduler for scheduling execution of containers on nodes, a storage server where the container orchestration platform 102 stores it's data. The distributed storage architecture may comprise a distributed cluster of nodes, such as worker nodes that host and manage containers, and also receive and execute orders from the controller node 101. As illustrated in FIG. 1A, for example, the distributed cluster of nodes (e.g., worker nodes) may comprise a first node 104, a second node 106, a third node 108, and/or any other number of other worker nodes.

Each node within the distributed storage architecture may be implemented as a virtual machine, physical hardware, or other software/logical construct. In some embodiments, a node may be part of a Kubernetes cluster used to run containerized applications within containers and handling networking between the containerized applications across the Kubernetes cluster or from outside the Kubernetes cluster. Implementing a node as a virtual machine or other software/logical construct provides the ability to easily create more nodes or deconstruct nodes on-demand in order to scale up or down based upon current demand.

The nodes of the distributed cluster of nodes may host pods that are used to run and manage containers from the perspective of the container orchestration platform 102. A pod may be a smallest deployable unit a computing resources that can be created and managed by the container orchestration platform 102 such as Kubernetes. The pod may support multiple containers and forms a cohesive unit of service for the applications hosted within the containers. That is, the pod provides shared storage, shared network resources, and a specification for how to run the containers grouped within the pod. In some embodiments, the pod may encapsulate an application composed of multiple co-located containers that share resources. These co-located containers form a single cohesive unit of service provided by the pod, such as where one container provides clients with access to files stored in a shared volume and another container updates the files on the shared volume. The pod wraps these containers, storage resources, and network resources together as single unit that is managed by the container orchestration platform 102.

In some embodiments, a storage application within a first container may access a deduplication application within a second container and a compression application within a third container in order deduplicate and/or compress data managed by the storage application. Because these applications cooperate together, single pod may be used to manage the containers hosting these applications. These containers that are part of the pod may be co-located and scheduled on a same node, such as the same physical hardware or virtual machine. This allows the containers to share resources and dependencies, communicate with one another, and/or coordinate their lifecycles of how and when the containers are terminated.

A node may host multiple containers, and one or more pods may be used to manage these containers. For example, a pod 105 within the first node 104 may manage a container 107 and/or other containers hosting applications that may interact with one another. A pod 129 within the second node 106 may manage a first container 133, a second container 135, and a third container 137 hosting applications that may interact with one another. A pod 139 of the second node 106 may manage one or more containers 141 hosting applications that may interact with one another. A pod 110 within the third node 108 may manage a fourth container 112 and a fifth container 121 hosting applications that may interact with one another.

The fourth container 112 may be used to execute applications (e.g., a Kubernetes application, a client application, etc.) and/or services such as storage management services that provide clients with access to storage hosted or managed by the container orchestration platform 102. In some embodiments, an application executing within the fourth container 112 of the third node 108 may provide clients with access to storage of a storage platform 114. For example, a file system service may be hosted through the fourth container 112. The file system service may be accessed by clients in order to store and retrieve data within storage of the storage platform 114. For example, the file system service may be an abstraction for a volume, which provides the clients with a mount point for accessing data stored through the file system service in the volume.

In some embodiments, the distributed cluster of nodes may store data within distributed storage 118. The distributed storage 118 may correspond to storage devices that may be located at various nodes of the distributed cluster of nodes. Due to the distributed nature of the distributed storage 118, data of a volume may be located across multiple storage devices that may be located at (e.g., physically attached to or managed by) different nodes of the distributed cluster of nodes. A particular node may be a current owner of the volume. However, ownership of the volume may be seamlessly transfer amongst different nodes. This allows applications, such as the file system service, to be easily migrated amongst containers and/or nodes such as for load balancing, failover, and/or other purposes.

In order to improve I/O latency and client performance, a primary cache may be implemented for each node. The primary cache may be implemented utilizing relatively faster storage, such as NVRAM, flash, 3D Xpoint, NVDIMM, etc. For example, the third node 108 may implement a primary cache 136 using a persistent key-value store that is stored within storage 116, such as NVRAM. In some embodiments, the storage 116 may store the persistent key-value store used as the primary cache and/or may also store a non-volatile log (NVlog). The Nvlog may be used by a storage operating system to log write operations before the write operations are stored into other storage such as storage hosting a volume managed by the storage operating system.

For example, a write operation may be received from a client application. The write operation may be quickly logged into the Nvlog because the Nvlog is stored within the relatively fast storage 116 such as the NVRAM. A response may be quickly provided back to the client application without having to write the data of the write operation to a final destination in the distributed storage 118. In this way, as write operations are received, the write operations are logged within the Nvlog. So that the Nvlog does not become full and run out of storage space for logging write operations, a consistency point may be triggered in order to replay the logged write operations and remove the logged write operations from the Nvlog to free up storage space for logging write operations.

When the Nvlog becomes full, reaches a certain fullness, or a certain amount of time has passed since a last consistency point was performed, the consistency point is triggered so that the Nvlog does not run out of storage space for logging write operations. Once the consistency point is triggered, logged write operations are replayed from the Nvlog to write data of the logged write operations to the distributed storage 118. Without the use of the Nvlog, the write operation would be executed and data of the write operation would be distributed across the distributed storage 118. This would take longer than logging the write operation because the distributed storage 118 may be comprised of relatively slower storage and/or the data may be stored across storage devices attached to other nodes. Thus, without the Nvlog, latency experienced by the client application is increased because a response for the write operation to the client will take longer. In contrast to the Nvlog where write operations are logged for subsequent replay, read and write operations are executed using the primary cache 136.

Figure 1B:
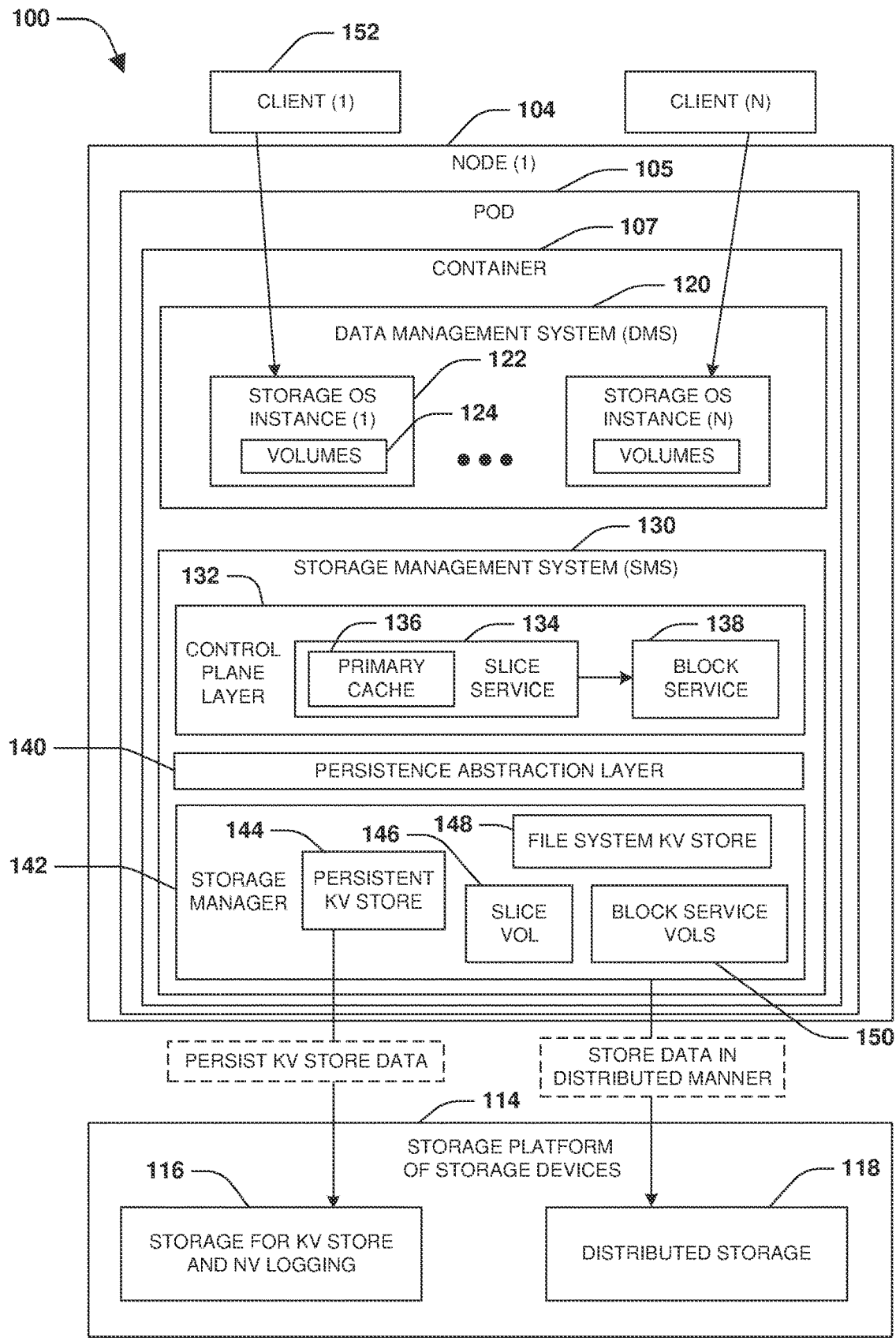
FIG. 1B is a block diagram illustrating an example of a node (e.g., a Kubernetes worker node) in accordance with various embodiments of the present technology.

FIG. 1B illustrates an architecture of a worker node, such as the first node 104 hosting the container 107 managed by the pod 105. The container 107 may execute an application, such as a storage application that provides clients with access to data stored within the distributed storage 118. That is, the storage application may provide the clients with read and write access to their data stored within the distributed storage 118 by the storage application. The storage application may be composed of a data management system 120 and a storage management system 130 executing within the container 107.

The data management system 120 is a frontend component of the storage application through which clients can access and interface with the storage application. For example, the first client 152 may transmit I/O operations to a storage operation system instance 122 hosted by the data management system 120 of the storage application. The data management system 120 routes these I/O operations to the storage management system 130 of the storage application.

The storage management system 130 manages the actual storage of data within storage devices of the storage platform 114, such as managing and tracking where the data is physically stored in particular storage devices. The storage management system 130 may also manage the caching of such data before the data is stored to the storage devices of the storage platform 114. By caching data through a primary cache 136 backed by a persistent key-value store 144 in a manner that reduces write amplification and improves performance compared to other types of caches that are not implemented as persistent key-value stores. For example, key-value record pairs can be resident within the persistent key-value store 144 until data of the key-value record pairs is to be written to the distributed storage 118 as a final destination. This reduces write amplification because the data is directly written from the persistent key-value store 144 to the final destination within the distributed storage 118 as opposed to being stored from the cache to an intermediate storage location that may not be the final destination.

Moreover, because the persistent key-value store 144 is a persistent tier, the persistent key-value store does not rely upon a file system to offload data for long term storage. This additionally reduces write amplification that would have been incurred from writing cached content from the cache to the volume using a non-volatile log (NVlog) of the file system, and then again from the volume to long term storage through a consistency point. Additionally, read operations can be locally served from the persistent key-value store, which avoids network hops to remote storage locations of the distributed storage that would otherwise introduce additional latency.

In addition, the persistent key-value store 144 provides a tier which serves as a transient container for data. Moreover, persistent key-value store 144 provides other properties typically not associated with a cache (e.g., journaling, crash protections, resiliency, etc.), while also providing read/write I/O which can be accessed using a key-value interface.

Because the storage application, such as the data management system 120 and the storage management system 130 of the storage application, are hosted within the container 107, multiple instances of the storage application may be created and hosted within multiple containers. That is, multiple containers may be deployed to host instances of the storage application that may each service I/O requests from clients. The I/O may be load balanced across the instances of the storage application within the different containers. This provides the ability to scale the storage application to meet demand by creating any number of containers to host instances of the storage application. Each container hosting an instance of the storage application may host a corresponding data management system and storage management system of the storage application. These containers may be hosted on the first node 104 and/or at other nodes.

For example, the data management system 120 may host one or more storage operating system instances, such as the first storage operating system instance 122 accessible to the first client 152 for storage data. In some embodiments, the first storage operating system instance 122 may run on an operating system (e.g., Linux) as a process and may support various protocols, such as NFS, CIFS, and/or other file protocols through which clients may access files through the first storage operating system instance 122. The first storage operating system instance 122 may provide an API layer through which clients, such as a first client 152, may set configurations (e.g., a snapshot policy, an export policy, etc.), settings (e.g., specifying a size or name for a volume), and transmit I/O operations directed to volumes 124 (e.g., FlexVols) exported to the clients by the first storage operating system instance 122. In this way, the clients communicate with the first storage operating system instance 122 through this API layer. The data management system 120 may be specific to the first node 104 (e.g., as opposed to a storage management system (SMS) 130 that may be a distributed component amongst nodes of the distributed cluster of nodes). In some embodiments, the data management system 120 and/or the storage management system 130 may be hosted within a container 107 managed by a pod 105 on the first node 104.

The first storage operating system instance 122 may comprise an operating system stack that includes a protocol layer (e.g., a layer implementing NFS, CIFS, etc.), a file system layer, a storage layer (e.g., a RAID layer), etc. The first storage operating system instance 122 may provide various techniques for communicating with storage, such as through ZAPI commands, REST API operations, etc. The first storage operating system instance 122 may be configured to communicate with the storage management system 130 through iSCSI, remote procedure calls (RPCs), etc. For example, the first storage operating system instance 122 may communication with virtual disks provided by the storage management system 130 to the data management system 120, such as through iSCSI and/or RPC.

The storage management system 130 may be implemented by the first node 104 as a storage backend. The storage management system 130 may be implemented as a distributed component with instances that are hosted on each of the nodes of the distributed cluster of nodes. The storage management system 130 may host a control plane layer 132. The control plane layer 132 may host a full operating system with a frontend and a backend storage system. The control plane layer 132 may form a control plane that includes control plane services, such as a slice service 134 that manages slice files used as indirection layers for accessing data on disk, a block service 138 that manages block storage of the data on disk, a transport service used to transport commands through a persistence abstraction layer 140 to a storage manager 142, and/or other control plane services. The slice service 134 may be implemented as a metadata control plane and the block service 138 may be implemented as a data control plane. Because the storage management system 130 may be implemented as a distributed component, the slice service 134 and the block service 138 may communicate with one another on the first node 104 and/or may communicate (e.g., through remote procedure calls) with other instances of the slice service 134 and the block service 138 hosted at other nodes within the distributed cluster of nodes.

In some embodiments of the slice service 134, the slice service 134 may utilize slices, such as slice files, as indirection layers. The first node 104 may provide the first client 152 with access to a LUN or volume through the data management system 120. The LUN may have N logical blocks that may be 1 kb each. If one of the logical blocks is in use and storing data, then the logical block has a block identifier of a block storing the actual data. A slice file for the LUN (or volume) has mappings that map logical block numbers of the LUN (or volume) to block identifiers of the blocks storing the actual data. Each LUN or volume will have a slice file, so there may be hundreds of slices files that may be distributed amongst the nodes of the distributed cluster of nodes. A slice file may be replicated so that there is a primary slice file and one or more secondary slice files that are maintained as copies of the primary slice file. When write operations and delete operations are executed, corresponding mappings that are affected by these operations are updated within the primary slice file. The updates to the primary slice file are replicated to the one or more secondary slice files. After, the write or deletion operations are responded back to a client as successful. Also, read operations may be served from the primary slice since the primary slice may be the authoritative source of logical block to block identifier mappings.

In some embodiments, the control plane layer 132 may not directly communicate with the storage platform 114, but may instead communicate through the persistence abstraction layer 140 to a storage manager 142 that manages the storage platform 114. In some embodiments, the storage manager 142 may comprise storage operating system functionality running on an operating system (e.g., Linux). The storage operating system functionality of the storage manager 142 may run directly from internal APIs (e.g., as opposed to protocol access) received through the persistence abstraction layer 140. In some embodiments, the control plane layer 132 may transmit I/O operations through the persistence abstraction layer 140 to the storage manager 142 using the internal APIs. For example, the slice service 134 may transmit I/O operations through the persistence abstraction layer 140 to a slice volume 146 hosted by the storage manager 142 for the slice service 134. In this way, slice files and/or metadata may be stored within the slice volume 146 exposed to the slice service 134 by the storage manager 142.

The storage manager 142 may expose a file system key-value store 148 to the block service 138. In this way, the block service 138 may access block service volumes 150 through the file system key-value store 148 in order to store and retrieve key-value store metadata and/or data. The storage manager 142 may be configured to directly communicate with storage device of the storage platform 114 such as the distributed storage 118 and/or the storage 116 (e.g., NVRAM) used to host a persistent key-value store 144 managed by the storage manager 142 for use as a primary cache 136 by the slice service 134 of the control plane layer 132.

It may be appreciated that the container orchestration platform 102 of FIGS. 1A and 1B is merely one example of a computing environment within which the techniques described herein may be implemented, and that the techniques described herein may be implemented in other types of computing environments (e.g., a cluster computing environment of nodes such as virtual machines or physical hardware, a non-containerized environment, a cloud computing environment, a hyperscaler, etc.).

Figure 2:
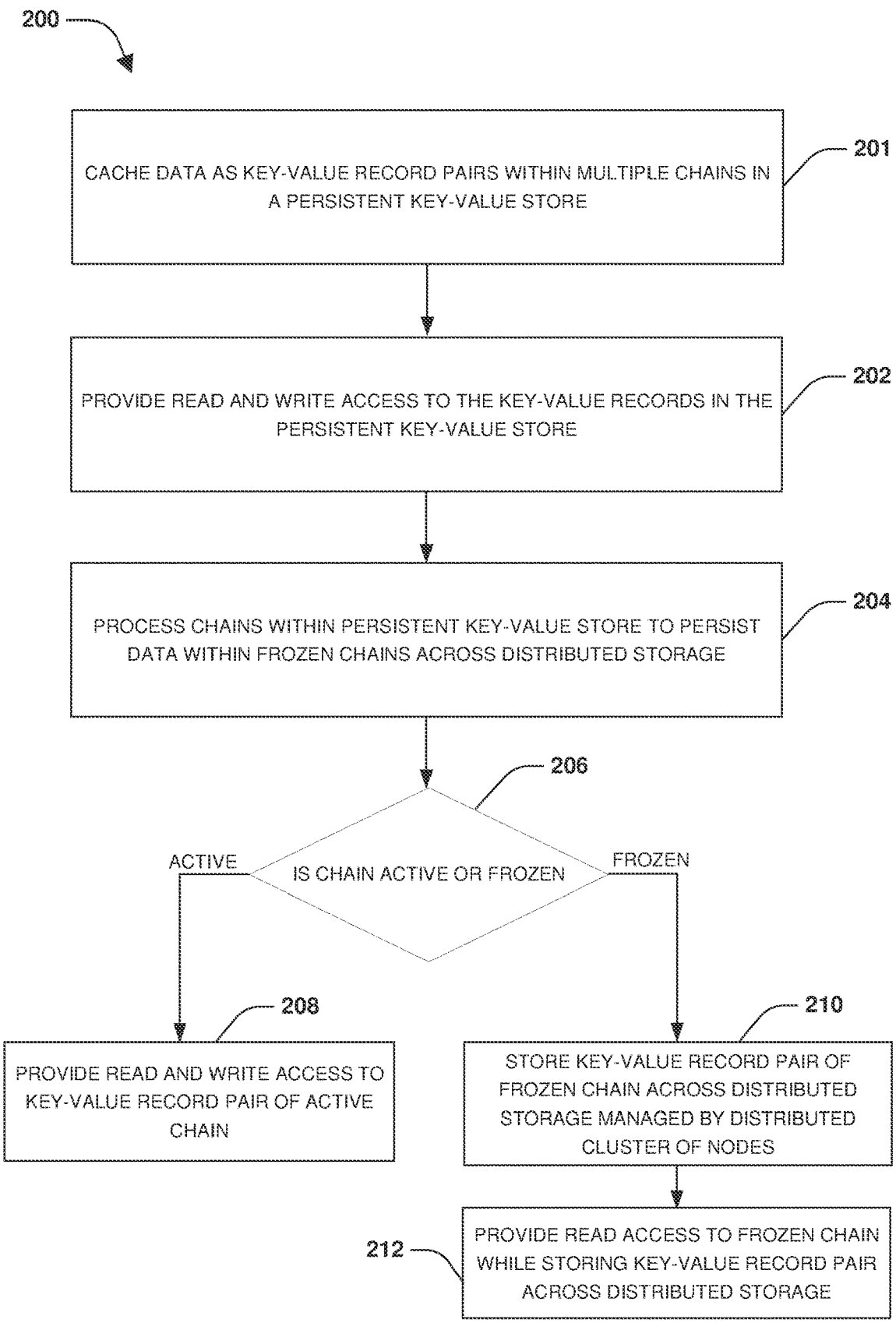
FIG. 2 is a flow chart illustrating an example of a set of operations that can be used for implementing a persistent key-value store for caching client data, journaling, and/or crash recovery in accordance with various embodiments of the present technology.

One embodiment of implementing a persistent key-value store for caching client data, journaling, and/or crash recovery is illustrated by an exemplary method 200 of FIG. 2 and further described in conjunction with distributed storage architecture 100 of FIGS. 1A-1B and FIGS. 3A-3D. A persistent key-value store is used as a primary cache for a node. During operation 201, data of write operations is cached with the primary cache as key-value record pairs within the persistent key-value store. The data may be stored as a value record of the key-value record pair and a key value (e.g., a hash of the data) may be stored as a key record of the key-value record pair. The key record may be used to uniquely identify and reference the value record. Read operations may be executed to read the cached data from the primary cache (e.g., read a value record of data in the persistent key-value store that is referenced by a key record).

Figure 3A:
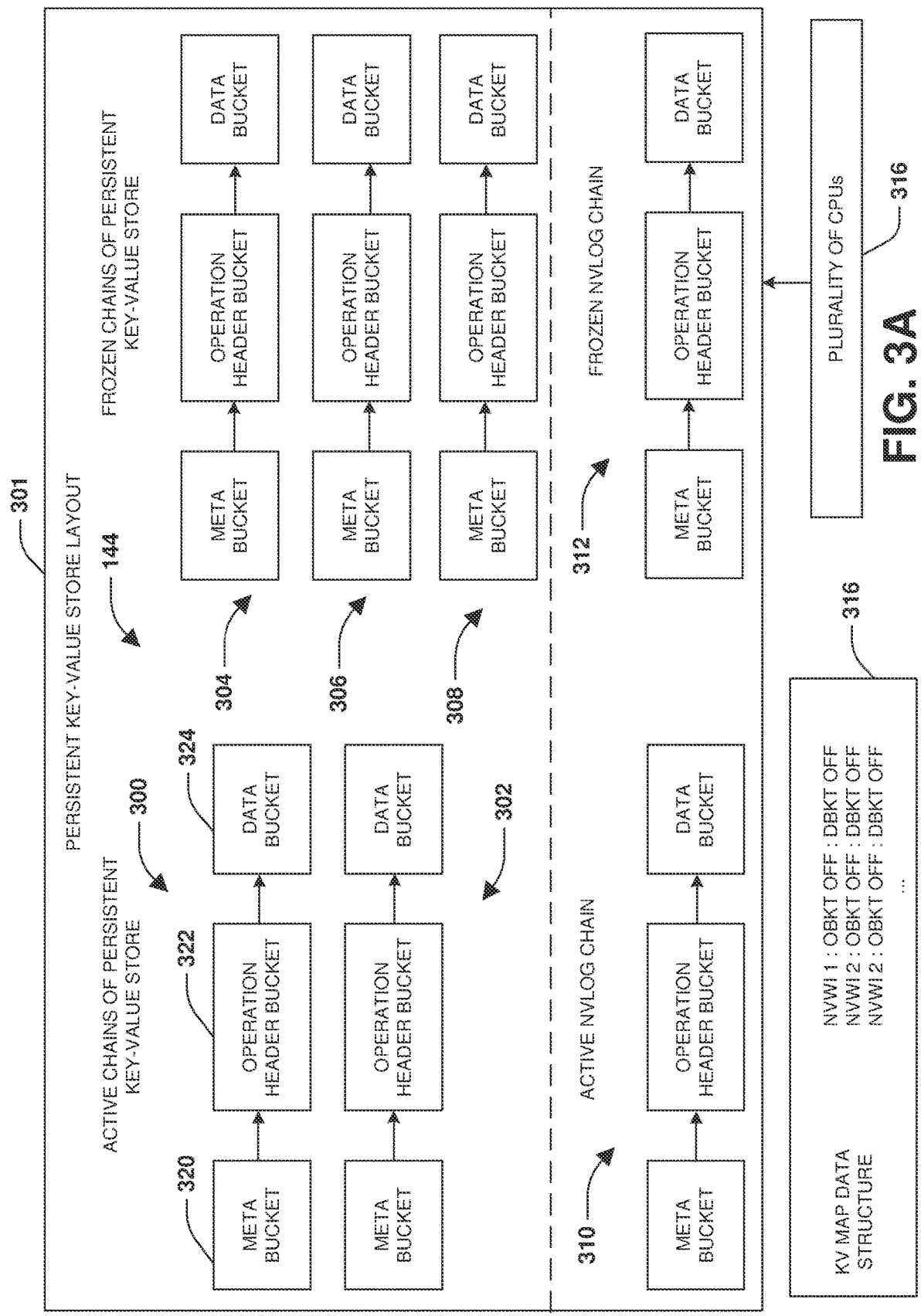
FIG. 3A is a block diagram illustrating an example of various chains stored within a persistent key-value store that may be used for caching client data, journaling, and/or crash recovery for containers in accordance with various embodiments of the present technology.

FIG. 3A illustrates a layout 301 of the persistent key-value store 144. The first node 104 may be configured to store data across the distributed storage 118 managed by nodes of the distributed cluster of nodes, such as the first node 104, the second node 106, the third node 108, etc. The data may be cached as key-value record pairs within the persistent key-value store 144 according to the layout 301 for read and write access until being written in a distributed manner across the distributed storage 118. During operation 202 of method 200, read and write access is provided to the primary cache 136. In some embodiments, the first node 104 may receive an I/O operation (a read or write operation) from the first client 152. The I/O operation may be processed by the data management system 120 of the container 107, which executes the I/O operation through the storage management system 130 upon the primary cache 136.

In some embodiments, the storage 116 (or other type of storage) may be used to store both the persistent key-value store 144 and a non-volatile log (NVlog). The NVlog may be used by a storage operating system to log file system operations before the logged file system operations are stored (flushed) to storage, such as where the file system operations are replayed upon a volume stored within a storage device/disk. In some embodiments, the NVlog may be used by the storage operating system to log internal file system write operations (e.g., metadata write operations that may set a last modified timestamp for a file, resize a volume, change access permissions for the volume, etc.) of a file system managed by the storage operating system for subsequent replay/execution upon storage. In some embodiments, the persistent key-value store 144 is used to cache data of client write operations (e.g., a client writing to a file) in key-value record pairs and provide read access to such cached data, as opposed to the internal file system write operations logged through the NVlog.

In some embodiments, the persistent key-value store 144 and the NVlog may share the storage space of the storage 116 and are not confined to certain storage regions/addresses. Because of this sharing of storage space, space management functionality may be implemented by the first node 104 for the storage 116. The space management functionality may track metrics associated with NVRAM storage utilization by the NVlog. The metrics may relate to a total amount of NVRAM storage being consumed by the NVlog, a percentage of the NVRAM storage being consumed by the NVlog, a remaining amount of available NVRAM storage, historic amounts of NVRAM storage consumed by the NVlog, etc.

The space management functionality may provide these metrics to the persistent key-value store 144, which may use this information to determine when to write key-value record pairs from the persistent key-value store 144 to the distributed storage 118. For example, the metrics may indicate a current amount and/or historic amounts of NVRAM storage consumed by the NVlog (e.g., the NVlog may historically consume 1.5 GB out of 3 GB of the NVRAM storage on average). The metrics may be used to calculate a remaining amount of NVRAM storage and/or a predicted amount of subsequent NVRAM storage that would be consumed. This calculation may be based upon the current amount and/or historic amounts of NVRAM storage consumed by the NVlog (e.g., 1.5 GB consumption), a current amount and/or historic amounts of NVRAM storage consumed by the persistent key-value store 144 (e.g., 1.2 GB consumption on average by the persistent key-value store 144), and/or a size of the NVRAM storage (e.g., 3 GB). In this way, a determination is made to write the key-value record pairs from the persistent key-value store 144 to the distributed storage 118 in order to free up NVRAM storage space so that the NVRAM storage space does not run out. For example, once total consumption reaches or is predicted to reach 2.8 GB, then the key-value record pairs may be written from the persistent key-value store 144 to the distributed storage 118.

The space management functionality may track metrics associated with NVRAM storage utilization by the persistent key-value store 144. The metrics may relate to a total amount of NVRAM storage being consumed by the persistent key-value store 144, a percentage of the NVRAM storage being consumed by the persistent key-value store 144, a remaining amount of available NVRAM storage, historic amounts of NVRAM storage consumed by the persistent key-value store 144, etc. The space management functionality may provide these metrics to the NVlog, which may be used to determine when to implement a consistency point to store (flush) logged write operations from the NVlog to storage (e.g., replay operations logged within the NVlog to a storage device in order to clear the logged operations from the NVlog for space management purposes).

For example, the metrics may indicate a current amount and/or historic amounts of NVRAM storage consumed by the persistent key-value store 144 (e.g., 1.2 GB consumption on average by the persistent key-value store 144). The metrics may be used to calculate a remaining amount of NVRAM storage (e.g., the remaining amount may correspond to a total storage size of the NVRAM storage minus what storage is currently consumed as indicated by the metrics) and/or a predicted amount of subsequent NVRAM storage that would be consumed (e.g., a historical average amount of NVRAM storage consumed, which may be identified by averaging the metrics tracked over time). This calculation may be based upon the current amount and/or historic amounts of NVRAM storage consumed by the persistent key-value store 144 (e.g., 1.2 GB consumption), a current amount and/or historic amounts of NVRAM storage consumed by the NVlog (e.g., the NVlog may historically consume 1.5 GB out of 3 GB of the NVRAM storage on average), and/or a size of the NVRAM storage (e.g., 3 GB). In this way, a determination is made to implement the consistency point to store (flush) logged write operations from the NVlog to storage in order to free up NVRAM storage space so that the NVRAM storage space does not run out. For example, once total consumption reaches or is predicted to reach a threshold amount (e.g., 2.8 GB), then the consistency point may be triggered. In this way, management of the NVlog and the persistent key-value store 144 may be aware of each other's storage utilization of the NVRAM storage so that storage space within the NVRAM does not become full.

When the persistent key-value store 144 physically stores data in the NVRAM storage, the persistent key-value store 144 may store the data as key-value record pairs that are physically stored within the NVRAM storage. For example, a key-value record pair can include a value record and a key record. The value record comprises data (e.g., a file, data being written to a volume, a blob of data, or any other type of data received by the storage application from a client for storage). The key record comprises an identifier used to reference the value record. For example, the key record comprises a hash of the data in the value record, which may be used to uniquely identify and reference the value record. That is, a hash function may take the data (e.g., data received by the storage application from the client for storage) as an input, and output a hash value used as the value record. In this way, the key-value record pair comprises the value record (the data) and the key record (the hash value of the data). Thus, the value record may be indexed by the key record so that the value record may be located and retrieved from storage.

Key-value record pairs may be stored within chains, as illustrated by FIG. 3A. A chain may comprise a data structure that includes buckets used to store key records and value records. For example, key-value record pairs may be stored within an active chain until the active chain becomes full. That is, an active chain may have a limit as to how many key-value record pairs can be stored within the active chain until the active chain is considered full (e.g., 500 key-value record pairs or any other number). An active chain is a chain available for storing new key-value record pairs. Once full, the active chain may be frozen as a frozen chain that is no longer available to store new key-value record pairs. Even though the frozen chain can no longer store new key-value record pairs, the key-value record pairs already within the frozen chain are available to read. Key-value record pairs within the frozen chain are then stored from the persistent key-value store 144 to the distributed storage 118 of the storage platform 114. Because a single application may be allowed to access a chain at any given point in time (e.g., if two applications attempt to write to the same key-value record pair within a chain, then data corruption could result), value record pairs may be stored within multiple chains so that different applications may concurrently access different chains in parallel.

Chains within the persistent key-value store 144 may be active chains or frozen chains. For example, the persistent key-value store 144 may comprise the first active chain 300, a second active chain 302, and/or other active chains, as illustrated by FIG. 3A. PUT operations may be executed upon active chains that are actively available for storing new key-value record pairs. The persistent key-value store 144 may comprise a first frozen chain 304, a second frozen chain 306, a third frozen chain 308, and/or other frozen chains not illustrated. GET operations may be executed upon active chains and/or frozen chains. When an active chain reaches a threshold size or a consistency point is reached, the active chain may be frozen as a frozen chain. Once frozen, key-value record pairs stored within the frozen chain are stored from the storage 116 to the distributed storage 118 in a distributed manner (e.g., key-value record pairs may be stored across different storage devices of the distributed storage 118 that are local to different nodes). In some embodiments, read access is provided to the frozen chain, such as while the key-value record pairs of the frozen chain are being stored to the distributed storage 118. Once the key-value record pairs and/or other data stored within the frozen chain have been distributed across the distributed storage 118, a frozen operation header bucket, a frozen meta bucket, and/or a frozen data bucket of the frozen chain may be freed from the storage 116 for use in storing other data.

Figure 3B:
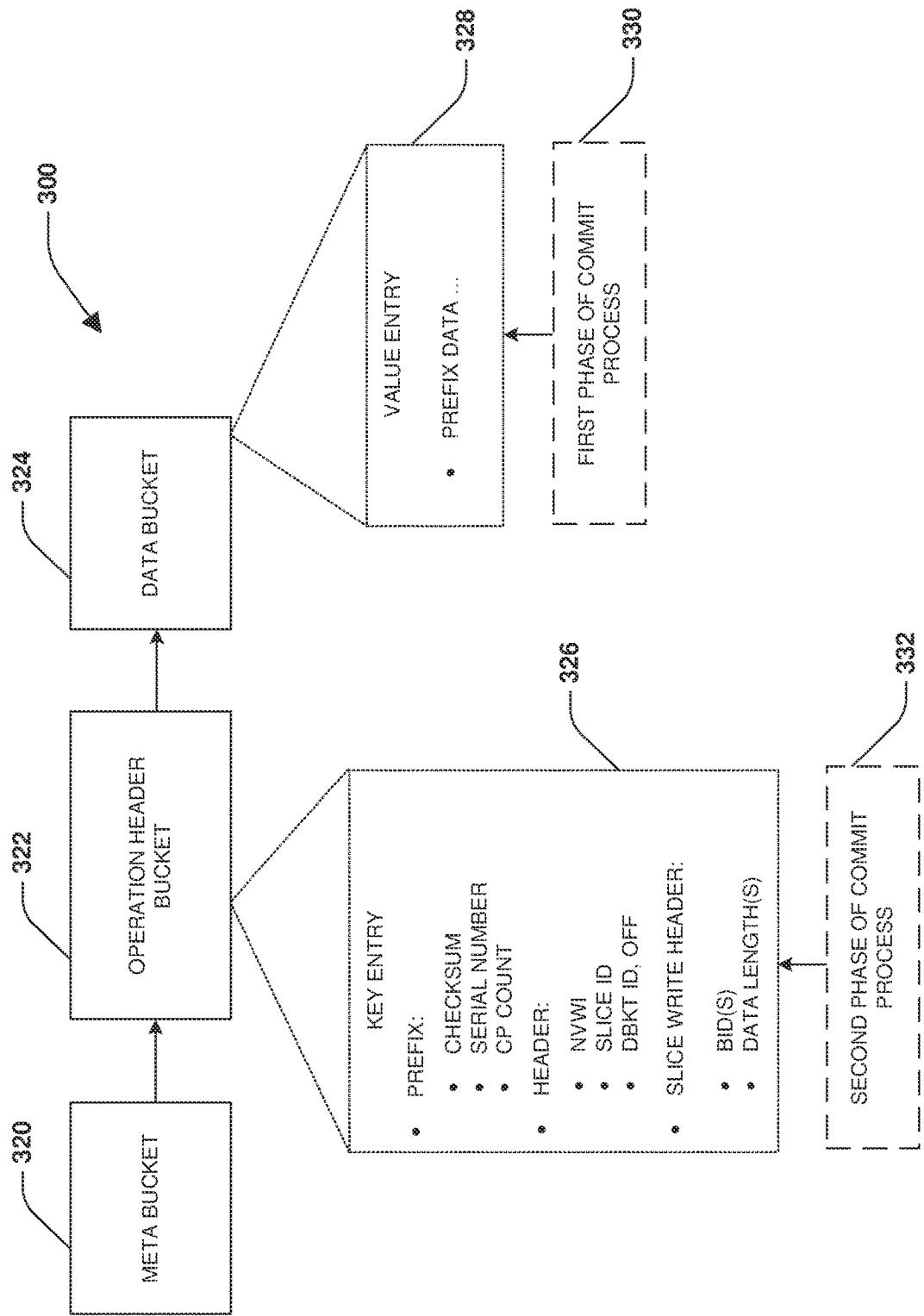
FIG. 3B is a block diagram illustrating an example of a chain stored within a persistent key-value store in accordance with various embodiments of the present technology.

An example of the first active chain 300 that is available for storing new key-value record pairs, is illustrated by FIG. 3B. The first active chain 300 may comprise a meta bucket 320, an operation header bucket 322, and/or a data bucket 324. The meta bucket 302 may comprise bucket chain metadata that points to the operation header bucket 322. The operation header bucket 322 may comprise a data bucket identifier and offset used to point to the data bucket 324. A key-value pair comprises a value record (e.g., data received by the storage application from the client for storage) and a key record (a unique identifier for the data).

Figure 3C:
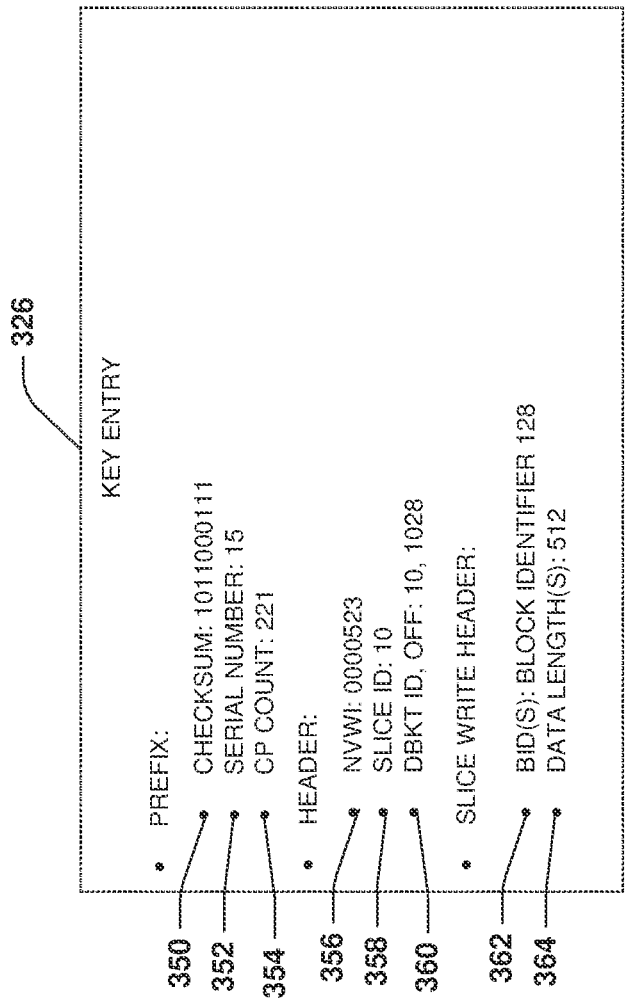
FIG. 3C is a block diagram illustrating an example of a key entry for a key record of a key-value record pair in accordance with various embodiments of the present technology.

For the key-value record pair, the operation header bucket 322 may be populated with a key entry 326 used to record the key record of the key-value record pair, which is further illustrated by FIG. 3C. The key record within the key entry 326 may correspond to a unique identifier for the value record of the key-value record pair. For example, the value record (data) may be input into a hash function that creates a hash of the value record as the unique identifier. Because the key record is a unique identifier for the value record, the key record may be used to reference and locate the value record. In this way, the key record may be used to index the value record. The data bucket 324 may be populated with a value entry 328 used to record the value record of the key-value record pair. The value record within the value entry 328 may comprise the actual data of the key-value record pair (e.g., a file, data being written to a volume, a blob of data, or any other type of data received by the storage application from a client for storage).

In some embodiments, a two-phase commit process is performed to store the key-value record pair. During a first phase 330, the value entry 328 is stored within the data bucket 324. During a second phase 332 subsequent successful completion of the first phase 330, the key entry 325 is stored within the operation header bucket 322. This two-phase commit process provides strict order and atomicity guarantees because the value entry 328 (data) is stored before the key entry 325 (e.g., a unique identifier referencing the data). This ensures that there is not an instance where the key entry 325 (e.g., the unique identifier referencing the data) has been persisted but a failure occurs before the value entry 328 (data) has been persisted, thus leaving a reference to non-existent data.

A prefix may be assigned to the key entry 326 and the value entry 328. In some embodiments, the same prefix may be assigned to both the key entry 326 and the value entry 328 so that prefix data of prefixes for the key entry 326 and the value entry 328 may be compared to validate the integrity of the key entry 326 and the value entry 328. The prefix may comprise prefix data. In some embodiments, the prefix data comprises a checksum 350 that may be used to validate the integrity of the key entry 326 and/or the value entry 328. For example, the storage management system 130 may implement checksum functionality that takes information within the key entry 326 and/or the value entry 328 as input, and outputs a checksum with a value of "1011000111" that can be used to verify the information within the key entry 326 and/or the value entry 328. In some embodiments, the prefix data comprises a serial number 352 with a value of "15" of a write operation that created the key-value record pair. For example, monotonically increasing serial numbers may be assigned to write operations, such as the write operation that wrote the value record tracked by the key entry 326. For example, the data management system 120 may assign the serial numbers as the write operations are received from the clients such as the first client 152. Accordingly, the write operation may be assigned the serial number 352 with the value of "15" (e.g., the write operation may be the 15th write operation received), and thus the serial number 352 with the value of "15" may be included within the prefix data.

In some embodiments, the prefix data comprises a consistency point count 354 with a value of "221" for a consistency point that included the write operation that wrote the value record tracked by the key entry 326 (e.g., the consistency point may be the 221st consistency point performed). For example, operations may be logged by a storage file system until a consistency point is reached (e.g., a log becomes full or a certain amount of time has occurred since a last consistency point). Once the consistency point is reached, the operations are replayed by writing data of the operations to storage. The consistency point is assigned a consistent point count by the storage operation system, such as a monotonically increasing number. In this way, the consistency point count 354 with the value of "221" for the consistency point that replayed the write operation is stored within the prefix. The prefix data may be used to subsequently verify and validate the key entry 326, the value entry 328, the first active chain 300, and/or the buckets within the first active chain 300.

The key entry 326 may also comprise a header. The header may be populated with a data bucket identifier and offset 360 used to point to the data bucket 324. For example, the value record may be stored within the data bucket 324 having a data bucket identifier of 10, and may be stored at an offset of 1028. The header may be populated with a slice identifier 358 of a slice used by the slice service 134 to track the value record. For example, the slice may be assigned the slice identifier 358 of 10, which may be used to locate the slice. The header may comprise a global virtual write index value (NVWI) 356 corresponding to a global sequentially incrementing record number of 0000523 for a write operation (e.g., a PUT operation) that wrote the value record of the key-value record pair.

In some embodiments, global virtual write index values may be assigned to key-value record pairs. The global virtual write index values may be global sequentially incrementing record numbers for PUT operations associated with the key-value record pairs, which may be stored within key entries for the key-value record pairs. The global virtual write index values may be used to perform cross-chain validation and verification by determining whether there are any missing global virtual write index values. Any missing global virtual write index values may be indicative of missing key or value entries since the global virtual write index values may be unique monotonically increasing numbers. The key entry 326 may also comprise a slice write header comprising block identifiers of blocks storing the value record and/or data lengths of the blocks (e.g., block 128 having a length of 512 kb may store the value record).

In some embodiments, a two-phase commit process is performed to store a key-value record pair into the persistent key-value store 144, as illustrated by FIG. 3B. In some embodiments, a PUT operation to store the key-value record pair may not be replied back to a client as successful until both phases have been successfully performed. The two-phase commit process may be performed to provide ordering and/or atomicity guarantees. As part of the two-phase commit process, a first phase is performed to record a value record of the key-value record pair as a value entry within a chain. During a second phase, a key record of the key-value record pair is recorded as a key entry within the chain. In some embodiments, the second phase may be performed only after the first phase has successfully completed. If there is a failure during the first phase, then neither the key record nor the value record is stored within the chain, and thus there is no corrupt data. If there is a failure after the first phase but before completion of the second phase, then the value record will have been stored within the chain but not the key record. The value record may subsequently be freed. With this ordering, there will not be an instance where the key record, but not the value record, is stored, which would otherwise result in the key record referencing invalid or missing data (the value record that was never stored due to the failure). In this way, FIG. 3B illustrates how the two-phase commit process is used to store the key-value record pair within the first active chain 300.

Returning to FIG. 3A, a key-value map data structure 316 may be maintained for the persistent key-value store 144. The key-value map data structure 316 may be populated with mappings between keys/values and corresponding key-value metadata used to identify virtual addresses (e.g., offsets within buckets) for accessing key records and value records. For example, a first mapping may map a first global virtual write index value NVWI1 to a first operation header bucket offset to a first data bucket offset. The first global virtual write index value NVWI1 may have been assigned to a PUT operation for a first key-value record pair of a first key record and a first value record. The first operation header bucket offset may be an offset within an operation header bucket of where a key entry of the first key record is located. The first data bucket offset may be an offset within a data bucket of where a value entry of the first value record is located. A second mapping may map a second global virtual write index value NVWI2 to a second operation header bucket offset to a second data bucket offset. The second global virtual write index value NVWI2 may have been assigned to a PUT operation for a second key-value record pair of a second key record and a second value record. The second operation header bucket offset may be an offset within an operation header bucket of where a key entry of the second key record is located. The second data bucket offset may be an offset within a data bucket of where a value entry of the second value record is located. The key-value map data structure 316 may be used to quickly locate key records and value records within the persistent key-value store 144.

In some embodiments, performance may be improved by performing operations upon different chains by different CPUs of a plurality of CPUs at any given point in time using a multi-threaded approach for improved performance. For example, a first processor may perform a first operation upon a first key-value record pair within a first chain. A second processor may be allowed to concurrently perform a second operation upon a second key-value record pair within a second chain different than the first chain. Because different chains are being operated upon, the operations may be performed without locking or blocking one another.

During operation 204, chains within the persistent key-value store 144 may be processed in order to determine whether key-value records within any of the chains can be stored to the distributed storage 118. In some embodiments of managing the chains within the persistent key-value store 144, a chain may be evaluated to determine whether the chain is an active chain or a frozen chain, during operation 206 of method 200. That is, an active indicator (e.g., a label, a flag, etc.) may be assigned to a chain if the chain is an active chain (e.g., the number of key-value record pairs stored in the chain has not reached a limit such as where an active chain is allowed to store up to 300 key-value record pairs). A frozen indicator (e.g., a label, a flag, etc.) may be assigned to the chain if the chain is a frozen chain (e.g., the number of key-value record pairs stored in the chain has reached the limit of 300 key-value record pairs). If the chain is an active chain, read and write access is provided to key-value record pairs stored within the active chain, during operation 208 of method 200. If the chain is a frozen chain, then the key-value record pairs in the frozen chain are stored in a distributed manner across the distributed storage 118 as the final destination, during operation 210 of method 200. It may be appreciated that other triggers may cause the key-value record pairs in the frozen chain to be stored in a distributed manner across the distributed storage 118 as the final destination, such as when a consistency point has been reached, a certain amount of time elapsing since key-value record pairs in frozen chains were stored to the distributed storage 118, the persistent key-value store 144 becoming full or becoming a certain percentage full (e.g., 90% storage space assigned to the persistent key-value store 144 has been used), etc.

During operation 212 of method 200, read access is provided to the frozen chain while key-value record pairs of the frozen chain are stored across the distributed storage 118. However, write access is not provided to the frozen chain. Once key-value record pairs in the frozen chain are stored across the distributed storage 118, the frozen chain may be freed to store other data. That is, the persistent key-value store 144 may physically store key-value record pairs within the storage 116 (e.g., NVRAM or other relatively fast and/or costly storage) that has a limited amount of physical storage. The distributed storage 118 may be composed of relatively cheaper and/or scalable storage. So that the storage 116 allocated to the persistent key-value store 144 does not become full and the persistent key-value store 144 cannot store new key-value record pairs, the key-value record pairs in the frozen chains are "flushed" from the persistent key-value store 144 (e.g., from the NVRAM) to the distributed storage 118 and the frozen chains are freed from storage 116 so that new key-value record pairs can be stored in the freed storage space.

The storage 116, allocated and used by the persistent key-value store 144, may also be used as storage for an NVlog. The NVlog may maintain a single active NVlog chain 310 and/or a single frozen NVlog chain 312 within the storage 116 at any given point in time. In some embodiments, a sync DMA transfer mode may be implemented for storing a data payload of an operation within a key-value record pair in-line with storing a metadata payload of the operation within the key-value record pair. The operation may be logged into a non-volatile log (NVlog) and the operation may be replied to in-line with the operation being processed. An async DMA transfer mode may be implemented for queuing a message to log the operation into the NVlog for subsequent processing. The sync DMA transfer mode or the async DMA transfer mode may be selected based upon a latency of a backing storage device (e.g., the storage 116), such as where the sync DMA transfer mode may be implemented for lower latency backing storage devices and the async DMA transfer mode may be implemented for higher latency backing storage devices. In some embodiments, the sync DMA transfer mode may provide high concurrency and lower memory usage in order to provide performance benefits. In some embodiments, the sync DMA transfer mode may be used for both NVlog and the persistent key-value store 144, such as where the backing storage device is a relatively fast persistent storage device. In some embodiments, the async DMA transfer mode may be used for both NVlog and the persistent key-value store 144, such as where a backing storage device is relatively slower media.

Figure 3D:
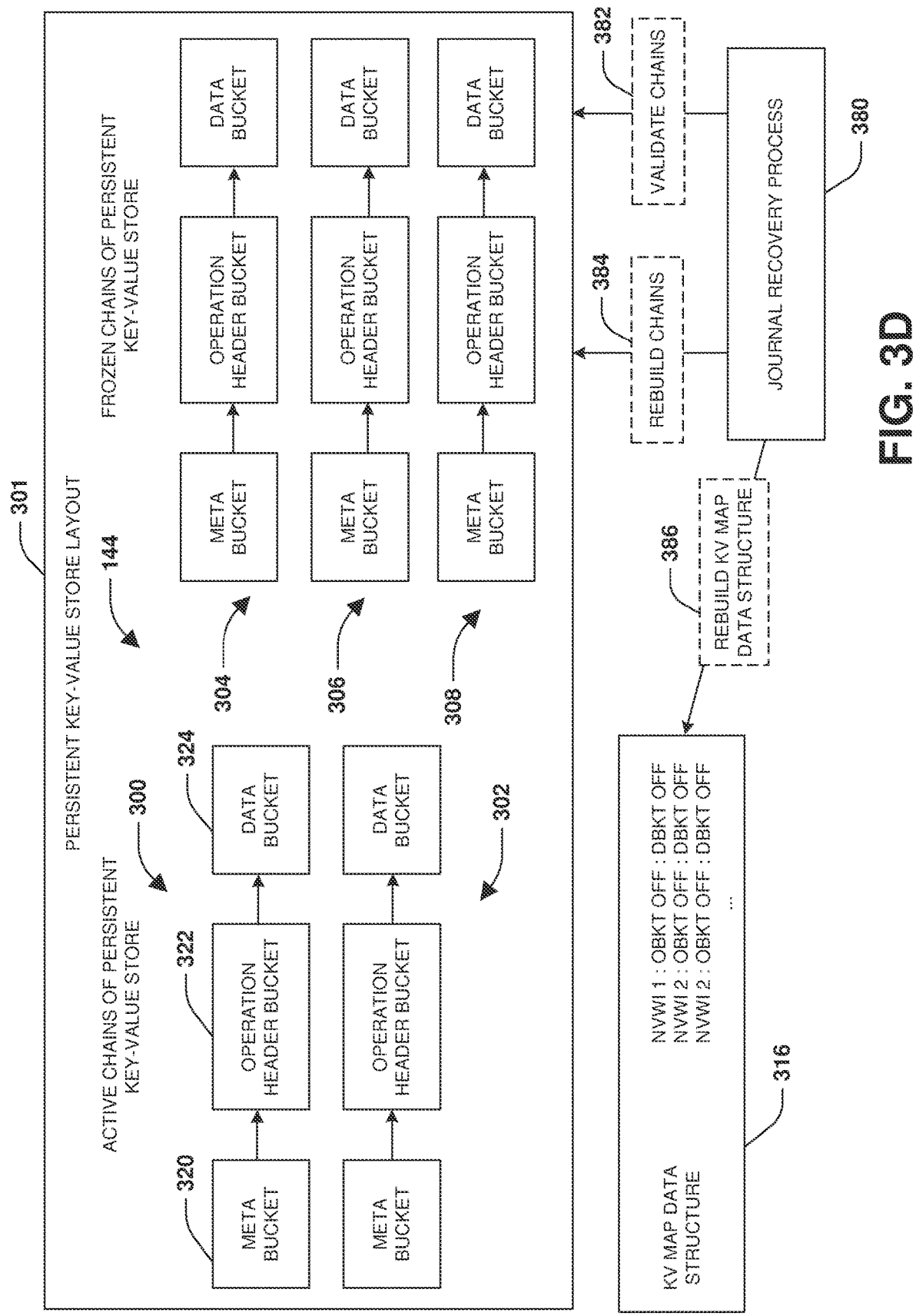
FIG. 3D is a block diagram illustrating an example of performing a journal recovery process in accordance with various embodiments of the present technology.
Figure 4:
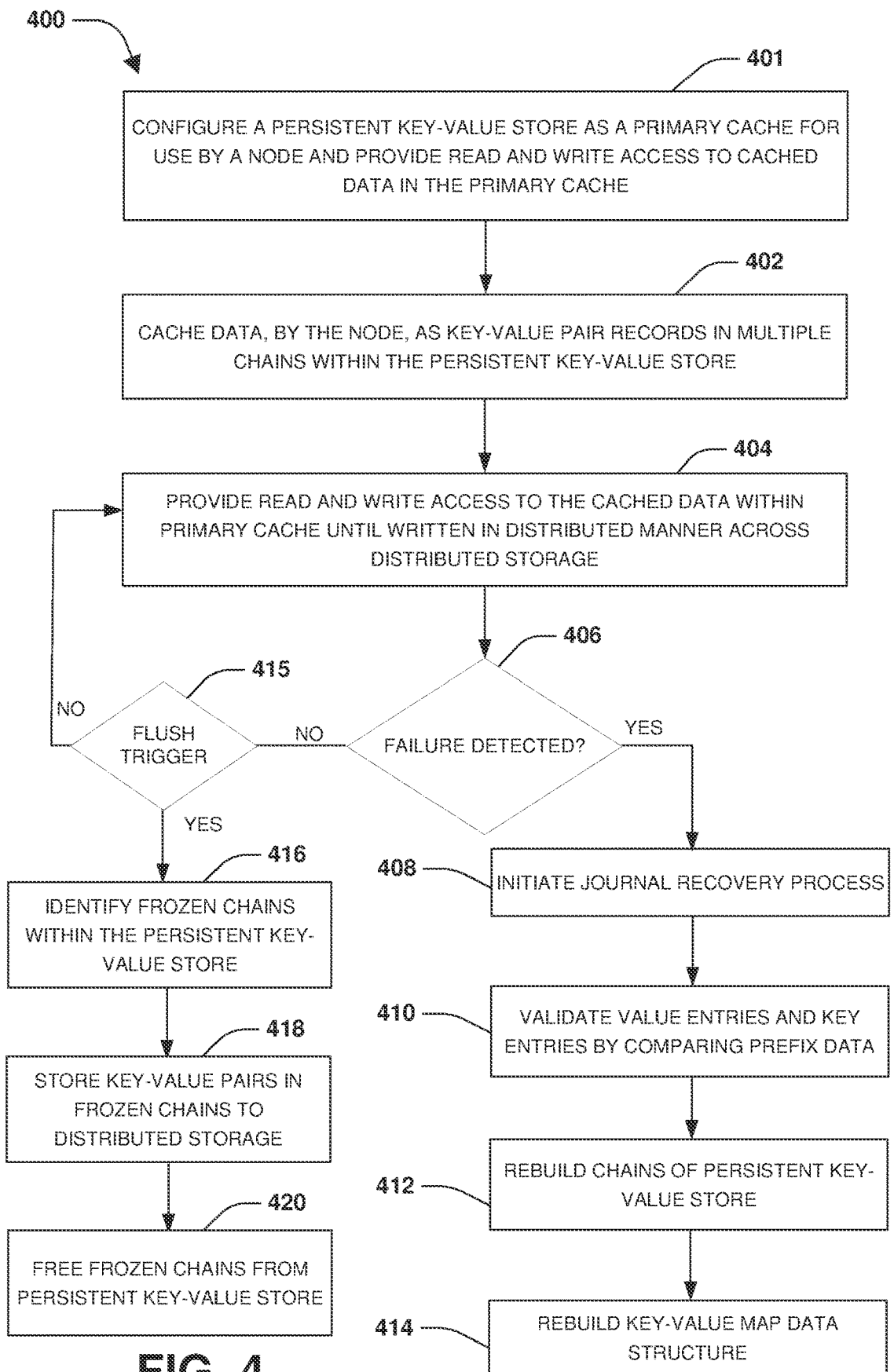
FIG. 4 is a flow chart illustrating an example of a set of operations for implementing a persistent key-value store for caching client data, journaling, and/or crash recovery in accordance with various embodiments of the present technology.

FIG. 3D illustrates a journal recovery process 380 that may be performed for the persistent key-value store 144. Operation of the journal recovery process 380 is described in relation to the exemplary method 400 of FIG. 4. During operation 401 of method 400, the persistent key-value store 144 is configured the primary cache for the first node 104 of the distributed cluster of nodes hosted within the container orchestration platform 102. Accordingly, data may be cached by the node as key-value record pairs in multiple chains within the persistent key-value store 144, during operation 402 of method 400. A chain may comprise an operation header bucket for recording key entries of key records and metadata of the key records. The chain may comprise a data bucket for recording value entries of value records. The chain may comprise a meta bucket for recording bucket chain metadata pointing to the operation header bucket that points to the data bucket.

For a key-value record pair stored within the persistent key-value store 144, a prefix may be assigned to a value entry and a key entry. The value entry may comprise the value record of the key-value record pair and may be stored within the data bucket. The key entry may comprise the key record of the key-value record pair and may be stored within the operation header bucket. The same prefix may be assigned to both the value entry and the key entry. The prefix may comprise a serial number of an operation that created the key-value record pair, a checksum, and/or a consistency point count of a consistency point that included the operation. In some embodiments, global virtual write index values (NVWIs) may be assigned to the key-value record pairs stored within the persistent key-value store. The global virtual write index values may be global sequentially incrementing (monotonically increasing) record numbers for PUT operations associated with the key-value record pairs. In some embodiments, key-value record pairs for different services may be stored in different chains for parallel access by the different services.

During operation 404 of method 400, read and write access may be provided, such as to the first client 152 through the data management system 120 and the storage management system 130 of the container 107, to data within the persistent key-value store 144 until written in a distributed matter across the distributed storage. The read and write access may be provided to the data within the primary cache by performing PUT operations and GET operations upon the key-value record pairs stored within the chains of the persistent key-value store 144. During operation 406, a determination is made as to whether a failure has occurred, such as a failure of the node, a failure of the distributed cluster of nodes, a failure of a component within the node, etc.

If operation 406 determines that a failure has not been detected, then operation 415 may be performed to determine whether a flush trigger has occurred. In some embodiments, the flush trigger may correspond to the persistent key-value store 144 having a threshold number of frozen chains (e.g., the flush trigger may occur once there is a least 3 frozen chains or any other number of frozen chains). Other flush triggers may relate to the persistent key-value store 144 being a threshold amount full (e.g., 70% of the storage space of the persistent key-value store 144 is in use), a threshold amount of time occurring since a prior flush trigger (e.g., the flush trigger may occur every 15 minutes), etc. If the flush trigger has occurred, then the persistent key-value store 144 is evaluated to identify frozen chains within the persistent key-value store 144, during operation 416. During operation 418, key-value pairs in the frozen chains are stored across the distributed storage 118. Once the key-value pairs in the frozen chains have been stored across the distributed storage, the frozen chains are freed from the persistent key-value store 144, during operation 420 of method 400.

During operation 408 of method 400, a journal recovery process is initiated in response to the operation 406 determining that a failure has been detected. The journal recovery process 380 may involve a variety of validations 382 of chains within the persistent key-value store 144, rebuilding 384 of chains with the persistent key-value store 144, and/or rebuilding 386 of the key-value map data structure 316, which may be performed at a key or value entry level, a chain level, a bucket level, a cross-chain level, etc., as illustrated by FIG. 3D.

The journal recovery process 380 may be implemented to ensure that the persistent key-value store 144 is valid and resilient by verifying/validating single record entries (e.g., the value entry 328 within the data bucket 324, the key entry 326 within the operation header bucket 322, etc.), chains (e.g., validation of the first active chain 300, validation of the second active chain 302), and/or multiple chains (e.g., cross-chain validation/verification across both the first active chain 300 and the second active chain 302). In order to recover from a crash, the journal recovery process 380 rebuilds the chains of the persistent key-value store 144 according to an order with which operations were previously performed to create the key-value record pairs to ensure that the chains are rebuilt into a consistent state. For example, serial numbers of operations that created the key-value record pairs may correspond to an order with which the key-value record pairs were created. The serial numbers may be increasing numbers that are assigned to each operation, and thus a first operation that created a first key-value record pair with a smaller serial number than a second operation that created a second key-value record pair was performed before the second operation. The serial numbers may be stored within prefix data (e.g., the serial number 352 within prefix data of the key entry 326) used to rebuild the chains according to the order with which operations were previously performed to create the key-value record pairs.

In some embodiments of performing the journal recovery process 380, a validation 382 may be performed for a value entry and/or a key entry by comparing prefixes of the value entry and the key entry to determine whether the prefixes or portions of prefix data within the prefixes match, during operation 410 of method 400. For example, prefix data within the prefixes may be compared to see if the prefix data matches (e.g., a serial number and/or a consistency point count) and/or the prefix data may be validated (e.g., a checksum may be used to determine whether an entry is valid). In some embodiments, cross-chain validation 382 may be performed by determine whether there are any missing global virtual write index values (NVWIs) amongst the chains, which can be identifiable because the global virtual write index values may be monotonically increasing numbers.

In some embodiments of performing the journal recovery process 380, the chains of the persistent key-value store are rebuilt 384, during operation 412 of method 400. For example, chains used to store key-value record pairs for a first service may be independently recovered and/or concurrently with the recovery of key-value record pairs stored within different chains for a second service in order to improve efficiency of rebuilding the persistent key-value store 144. The chains may be rebuilt according to an order of which operations associated with the key-value record pairs were executed, such as an order with which PUT operations and/or GET operations were performed. This ensures that the chains are rebuilt into a consistent state in relation to a state of the chains before the failure. In some embodiments, active chains may be rebuilt according to a strict ordering of which the operations were executed, while frozen chains may be rebuilt according to any order. During operation 414 of method 400, the journal recovery process 380 may also be performed to rebuild 386 the key-value map data structure 316 that associates keys and values with corresponding key-value metadata of indexing information. In this way, crash recovery may be implemented for improve resiliency of the persistent key-value store 144.

Figure 5:
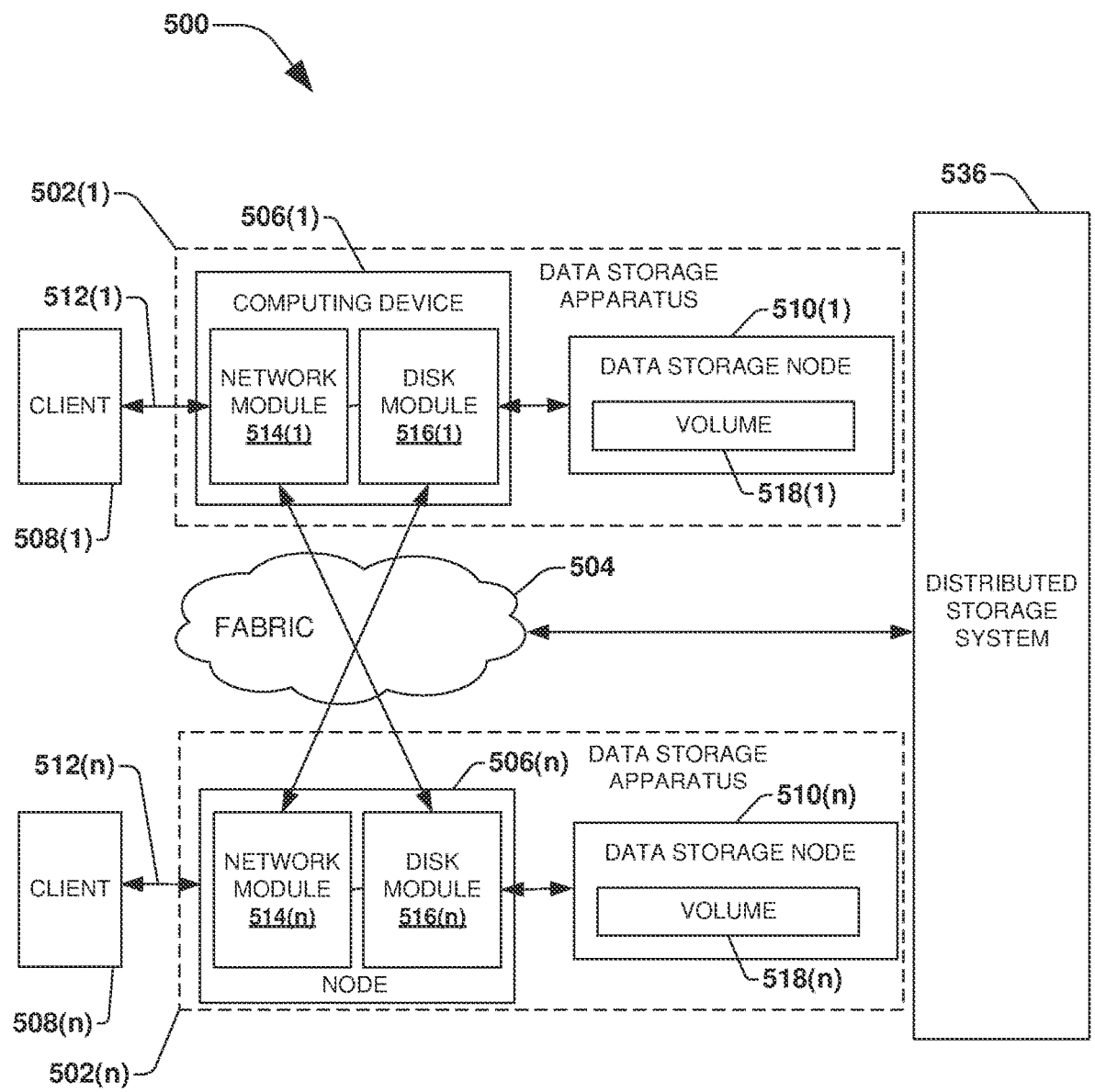
FIG. 5 is a block diagram illustrating an example of a network environment with exemplary nodes in accordance with various embodiments of the present technology.

A clustered network environment 500 that may implement one or more aspects of the techniques described and illustrated herein is shown in FIG. 5. The clustered network environment 500 includes data storage apparatuses 502(1)-502(n) that are coupled over a cluster or cluster fabric 504 that includes one or more communication network(s) and facilitates communication between the data storage apparatuses 502(1)-502(n) (and one or more modules, components, etc. therein, such as, computing devices 506(1)-506(n), for example), although any number of other elements or components can also be included in the clustered network environment 500 in other examples.

In accordance with one embodiment of the disclosed techniques presented herein, a persistent key-value store may be implemented for the clustered network environment 500. The persistent key-value store may be implemented for the computing devices 506(1)-506(n). For example, the persistent key-value store may be used to implement a primary cache for the computing device 506(1) so that data may be cached by the computing device 506(1) as key-value record pairs within the persistent key-value store. Operation of the persistent key-value store is described further in relation to FIGS. 1A, 1B, 2, 3A, 3B, and 4.

In this example, computing devices 506(1)-506(n) can be primary or local storage controllers or secondary or remote storage controllers that provide client devices 508(1)-508(n) with access to data stored within data storage devices 510(1)-510(n) and storage devices of a distributed storage system 536. The computing devices 506(1)-506(n) may be implemented as hardware, software (e.g., a storage virtual machine), or combination thereof. The computing devices 506(1)-506(n) may be used to host containers of a container orchestration platform.

The data storage apparatuses 502(1)-502(n) and/or computing devices 506(1)-506(n) of the examples described and illustrated herein are not limited to any particular geographic areas and can be clustered locally and/or remotely via a cloud network, or not clustered in other examples. Thus, in one example the data storage apparatuses 502(1)-502(n) and/or computing device computing device 506(1)-506(n) can be distributed over a plurality of storage systems located in a plurality of geographic locations (e.g., located on-premise, located within a cloud computing environment, etc.); while in another example a clustered network can include data storage apparatuses 502(1)-502(n) and/or computing device computing device 506(1)-506(n) residing in a same geographic location (e.g., in a single on-site rack).

In the illustrated example, one or more of the client devices 508(1)-508(n), which may be, for example, personal computers (PCs), computing devices used for storage (e.g., storage servers), or other computers or peripheral devices, are coupled to the respective data storage apparatuses 502(1)-502(n) by network connections 512(1)-512(n). Network connections 512(1)-512(n) may include a local area network (LAN) or wide area network (WAN) (i.e., a cloud network), for example, that utilize TCP/IP and/or one or more Network Attached Storage (NAS) protocols, such as a Common Internet File system (CIFS) protocol or a Network File system (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 508(1)-508(n) may be general-purpose computers running applications and may interact with the data storage apparatuses 502(1)-502(n) using a client/server model for exchange of information. That is, the client devices 508(1)-508(n) may request data from the data storage apparatuses 502(1)-502(n) (e.g., data on one of the data storage devices 510(1)-510(n) managed by a network storage controller configured to process I/O commands issued by the client devices 508(1)-508(n)), and the data storage apparatuses 502(1)-502(n) may return results of the request to the client devices 508(1)-508(n) via the network connections 512(1)-512(n).

The computing devices 506(1)-506(n) of the data storage apparatuses 502(1)-502(n) can include network or host computing devices that are interconnected as a cluster to provide data storage and management services, such as to an enterprise having remote locations, cloud storage (e.g., a storage endpoint may be stored within storage devices of the distributed storage system 536), etc., for example. Such computing devices 506(1)-506(n) can be attached to the cluster fabric 504 at a connection point, redistribution point, or communication endpoint, for example. One or more of the computing devices 506(1)-506(n) may be capable of sending, receiving, and/or forwarding information over a network communications channel, and could comprise any type of device that meets any or all of these criteria.

In an embodiment, the computing devices 506(1) and 506(n) may be configured according to a disaster recovery configuration whereby a surviving computing device provides switchover access to the data storage devices 510(1)-510(n) in the event a disaster occurs at a disaster storage site (e.g., the computing device computing device 506(1) provides client device 512(n) with switchover data access to data storage devices 510(n) in the event a disaster occurs at the second storage site). In other examples, the computing device computing device 506(n) can be configured according to an archival configuration and/or the computing devices 506(1)-506(n) can be configured based on another type of replication arrangement (e.g., to facilitate load sharing). Additionally, while two computing devices are illustrated in FIG. 5, any number of computing devices or data storage apparatuses can be included in other examples in other types of configurations or arrangements.

As illustrated in the clustered network environment 500, computing devices 506(1)-506(n) can include various functional components that coordinate to provide a distributed storage architecture. For example, the computing devices 506(1)-506(n) can include network modules 514(1)-514(n) and disk modules 516(1)-516(n). Network modules 514(1)-514(n) can be configured to allow the computing devices 506(1)-506(n) (e.g., network storage controllers) to connect with client devices 508(1)-508(n) over the storage network connections 512(1)-512(n), for example, allowing the client devices 508(1)-508(n) to access data stored in the clustered network environment 500.

Further, the network modules 514(1)-514(n) can provide connections with one or more other components through the cluster fabric 504. For example, the network module 514(1) of computing device computing device 506(1) can access the data storage device 510(n) by sending a request via the cluster fabric 504 through the disk module 516(n) of computing device computing device 506(n) when the computing device computing device 506(n) is available. Alternatively, when the computing device computing device 506(n) fails, the network module 514(1) of computing device computing device 506(1) can access the data storage device 510(n) directly via the cluster fabric 504. The cluster fabric 504 can include one or more local and/or wide area computing networks (i.e., cloud networks) embodied as Infiniband, Fibre Channel (FC), or Ethernet networks, for example, although other types of networks supporting other protocols can also be used.

Disk modules 516(1)-516(n) can be configured to connect data storage devices 510(1)-510(n), such as disks or arrays of disks, SSDs, flash memory, or some other form of data storage, to the computing devices 506(1)-506(n). Often, disk modules 516(1)-516(n) communicate with the data storage devices 510(1)-510(n) according to the SAN protocol, such as SCSI or FCP, for example, although other protocols can also be used. Thus, as seen from an operating system on computing devices 506(1)-506(n), the data storage devices 510(1)-510(n) can appear as locally attached. In this manner, different computing devices 506(1)-506(n), etc. may access data blocks, files, or objects through the operating system, rather than expressly requesting abstract files.

While the clustered network environment 500 illustrates an equal number of network modules 514(1)-514(n) and disk modules 516(1)-516(n), other examples may include a differing number of these modules. For example, there may be a plurality of network and disk modules interconnected in a cluster that do not have a one-to-one correspondence between the network and disk modules. That is, different computing devices can have a different number of network and disk modules, and the same computing device computing device can have a different number of network modules than disk modules.

Further, one or more of the client devices 508(1)-508(n) can be networked with the computing devices 506(1)-506(n) in the cluster, over the storage connections 512(1)-512(n). As an example, respective client devices 508(1)-508(n) that are networked to a cluster may request services (e.g., exchanging of information in the form of data packets) of computing devices 506(1)-506(n) in the cluster, and the computing devices 506(1)-506(n) can return results of the requested services to the client devices 508(1)-508(n). In one example, the client devices 508(1)-508(n) can exchange information with the network modules 514(1)-514(n) residing in the computing devices 506(1)-506(n) (e.g., network hosts) in the data storage apparatuses 502(1)-502(n).

In one example, the storage apparatuses 502(1)-502(n) host aggregates corresponding to physical local and remote data storage devices, such as local flash or disk storage in the data storage devices 510(1)-510(n), for example. One or more of the data storage devices 510(1)-510(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 518(1)-518(n) in this example, although any number of volumes can be included in the aggregates. The volumes 518(1)-518(n) are virtual data stores or storage objects that define an arrangement of storage and one or more file systems within the clustered network environment 500. Volumes 518(1)-518(n) can span a portion of a disk or other storage device, a collection of disks, or portions of disks, for example, and typically define an overall logical arrangement of data storage. In one example, volumes 518(1)-518(n) can include stored user data as one or more files, blocks, or objects that may reside in a hierarchical directory structure within the volumes 518(1)-518(n).

Volumes 518(1)-518(n) are typically configured in formats that may be associated with particular storage systems, and respective volume formats typically comprise features that provide functionality to the volumes 518(1)-518(n), such as providing the ability for volumes 518(1)-518(n) to form clusters, among other functionality. Optionally, one or more of the volumes 518(1)-518(n) can be in composite aggregates and can extend between one or more of the data storage devices 510(1)-510(n) and one or more of the storage devices of the distributed storage system 536 to provide tiered storage, for example, and other arrangements can also be used in other examples.

In one example, to facilitate access to data stored on the disks or other structures of the data storage devices 510(1)-510(n), a file system may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 510(1)-510(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 510(1)-510(n) can have one or more physical ports, wherein each physical port can be assigned a target address (e.g., SCSI target address). To represent respective volumes, a target address on the data storage devices 510(1)-510(n) can be used to identify one or more of the LUNs. Thus, for example, when one of the computing devices 506(1)-506(n) connects to a volume, a connection between the one of the computing devices 506(1)-506(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 6:
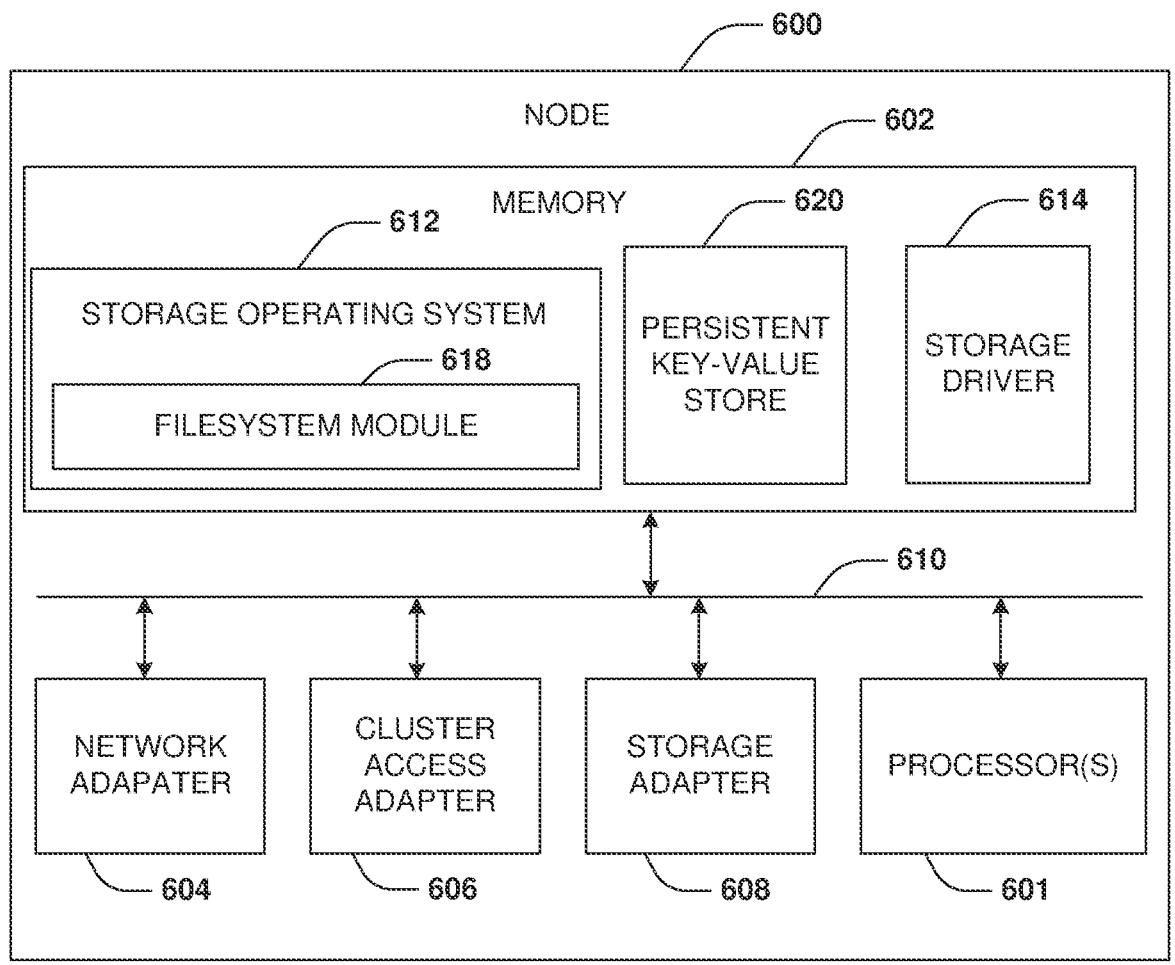
FIG. 6 is a block diagram illustrating an example of various components that may be present within a node that may be used in accordance with various embodiments of the present technology.

Referring to FIG. 6, a node 600 in this particular example includes processor(s) 601, a memory 602, a network adapter 604, a cluster access adapter 606, and a storage adapter 608 interconnected by a system bus 610. In other examples, the node 600 comprises a virtual machine, such as a virtual storage machine.

The node 600 also includes a storage operating system 612 installed in the memory 602 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 604 in this example includes the mechanical, electrical and signaling circuitry needed to connect the node 600 to one or more of the client devices over network connections, which may comprise, among other things, a point-to-point connection or a shared medium, such as a local area network. In some examples, the network adapter 604 further communicates (e.g., using TCP/IP) via a cluster fabric and/or another network (e.g., a WAN) (not shown) with storage devices of a distributed storage system to process storage operations associated with data stored thereon.

The storage adapter 608 cooperates with the storage operating system 612 executing on the node 600 to access information requested by one of the client devices (e.g., to access data on a data storage device managed by a network storage controller). The information may be stored on any type of attached array of writeable media such as magnetic disk drives, flash memory, and/or any other similar media adapted to store information.

In the exemplary data storage devices, information can be stored in data blocks on disks. The storage adapter 608 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 608 and, if necessary, processed by the processor(s) 601 (or the storage adapter 608 itself) prior to being forwarded over the system bus 610 to the network adapter 604 (and/or the cluster access adapter 606 if sending to another node computing device in the cluster) where the information is formatted into a data packet and returned to a requesting one of the client devices and/or sent to another node computing device attached via a cluster fabric. In some examples, a storage driver 614 in the memory 602 interfaces with the storage adapter to facilitate interactions with the data storage devices.

The storage operating system 612 can also manage communications for the node 600 among other devices that may be in a clustered network, such as attached to the cluster fabric. Thus, the node 600 can respond to client device requests to manage data on one of the data storage devices or storage devices of the distributed storage system in accordance with the client device requests.

The file system module 618 of the storage operating system 612 can establish and manage one or more file systems including software code and data structures that implement a persistent hierarchical namespace of files and directories, for example. As an example, when a new data storage device (not shown) is added to a clustered network system, the file system module 618 is informed where, in an existing directory tree, new files associated with the new data storage device are to be stored. This is often referred to as "mounting" a file system.

In the example node 600, memory 602 can include storage locations that are addressable by the processor(s) 601 and adapters 604, 606, and 608 for storing related software application code and data structures. The processor(s) 601 and adapters 604, 606, and 608 may, for example, include processing elements and/or logic circuitry configured to execute the software code and manipulate the data structures.

The storage operating system 612, portions of which are typically resident in the memory 602 and executed by the processor(s) 601, invokes storage operations in support of a file service implemented by the node 600. Other processing and memory mechanisms, including various computer readable media, may be used for storing and/or executing application instructions pertaining to the techniques described and illustrated herein. For example, the storage operating system 612 can also utilize one or more control files (not shown) to aid in the provisioning of virtual machines.

In this particular example, the node 600 also includes a module configured to implement the techniques described herein, as discussed above and further below. In accordance with one embodiment of the techniques described herein, a persistent key-value store 620 may be implemented for node 600. The persistent key-value store 620 may be located within memory 602, such as NVRAM. The persistent key-value store 620 may be used to implement a primary cache for the node 600 so that data may be cached by the node 600 as key-value record pairs within the persistent key-value store 620. Operation of the persistent key-value store 620 is described further in relation to FIGS. 1A, 1B, 2, 3A, 3B, 3C, 3D, and 4.

The examples of the technology described and illustrated herein may be embodied as one or more non-transitory computer or machine readable media, such as the memory 602, having machine or processor-executable instructions stored thereon for one or more aspects of the present technology, which when executed by processor(s), such as processor(s) 601, cause the processor(s) to carry out the steps necessary to implement the methods of this technology, as described and illustrated with the examples herein. In some examples, the executable instructions are configured to perform one or more steps of a method described and illustrated later.

Figure 7:
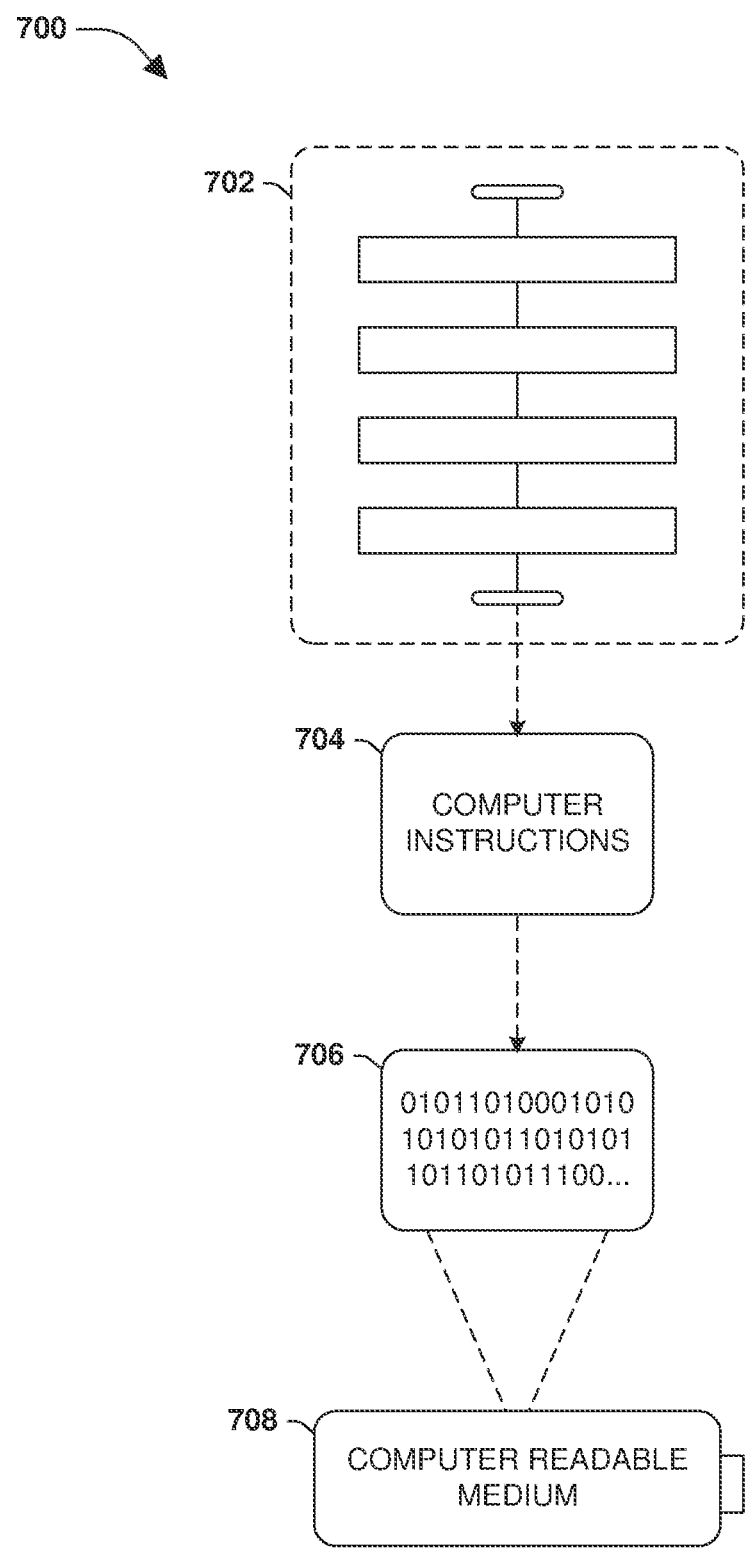
FIG. 7 is an example of a computer readable medium in which various embodiments of the present technology may be implemented.

Still another embodiment involves a computer-readable medium 700 comprising processor-executable instructions configured to implement one or more of the techniques presented herein. An example embodiment of a computer-readable medium or a computer-readable device that is devised in these ways is illustrated in FIG. 7, wherein the implementation comprises a computer-readable medium 708, such as a compact disc-recordable (CD-R), a digital versatile disc-recordable (DVD-R), flash drive, a platter of a hard disk drive, etc., on which is encoded computer-readable data 706. This computer-readable data 706, such as binary data comprising at least one of a zero or a one, in turn comprises processor-executable computer instructions 704 configured to operate according to one or more of the principles set forth herein. In some embodiments, the processor-executable computer instructions 704 are configured to perform a method 702, such as at least some of the exemplary method 200 of FIG. 2 and/or at least some of the exemplary method 400 of FIG. 4, for example. In some embodiments, the processor-executable computer instructions 704 are configured to implement a system, such as at least some of the exemplary distributed storage architecture 100 of FIGS. 1A-1B and/or at least some of the exemplary system of FIGS. 3A-3D, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system, comprising:
   a distributed cluster of nodes; and
   a storage management system configured to:
     store a key-value record pair within a chain in a persistent key-value store,
       wherein a chain includes an operation header bucket for recording key entries of key records and metadata of the key records, a data bucket for recording value entries of value records, and a meta bucket for recording bucket chain metadata pointing to the operation header bucket that points to the data bucket; and
     in response to detecting a failure associated with the distributed cluster of nodes, perform a journal recovery process to rebuild the chains, including operation header buckets, data buckets, and meta buckets, of the persistent key-value store according to an order of which operations associated with the key-value record pairs were executed.

2. The system of claim 1, wherein the storage management system is further configured to:
   utilize a key-value map data structure, associating keys and values with corresponding key-value metadata, to identify corresponding key-value metadata associated with the key-value record pair; and
   use indexing information within the corresponding key-value metadata to identify virtual addresses for accessing the key record and the value record within storage.

3. The system of claim 1, wherein the storage management system is further configured to:
   assign global virtual write index values to the key-value record pairs,
     wherein the global virtual write index values are global sequentially incrementing record numbers for PUT operations associated with the key-value record pairs.

4. The system of claim 3, wherein the storage management system is further configured to:
   perform a validation for the chains within the persistent key-value store by determining whether there are missing global virtual write index values.

5. The system of claim 1, wherein the storage management system is further configured to:
   assign a prefix to a value entry of the key-value record pair and the same prefix to a key entry of the key-value record pair,
     wherein the prefix includes at least one of a serial number of an operation that created the key-value record pair, a checksum, or a consistency point count of a consistency point that included the operation; and
   perform a validation for the key-value record pair by determining whether prefixes of the value entry and the key entry match.

6. The system of claim 1, comprising:
   a non-volatile random access memory (NVRAM) configured to store the persistent key-value store as a primary cache and store a non-volatile log (NVlog) used by a storage operating system to log write operations before being stored to storage.

7. The system of claim 1, wherein the storage management system is further configured to:
   perform, by a first processor, a first operation upon a first key-value record pair within a first chain; and
   perform, by a second processor, a second operation upon a second key-value record pair within a second chain, wherein the first operation and the second operation are performed concurrently without locking based upon the first operation and the second operation targeting different chains.

8. The system of claim 1, wherein the storage management system is configured to:
   direct write operations to active chains within the persistent key-value store; and
   direct read operations to the active chains and frozen chains within the persistent key-value store.

9. The system of claim 8, wherein the storage management system is configured to:
   in response to an active chain reaching a threshold size or a consistency point being reached, freeze the active chain as a frozen chain and persist data within the frozen chain across distributed storage.

10. The system of claim 1, wherein the storage management system is further configured to:
    in response to an active chain reaching a threshold size, freeze the active chain as a frozen chain and persist data within the frozen chain across distributed storage; and
    in response to the data being persisted across the distributed storage, free a frozen operation header bucket, a frozen meta bucket, and a frozen data bucket of the frozen chain.

11. A system, comprising:
    a distributed cluster of nodes; and
    a storage management system configured to:
      store a key-value record pair within a chain in a persistent key-value store, wherein the chain includes key records, metadata of the key records, and value entries of value records; and in response to detecting a failure associated with the distributed cluster of nodes, perform a journal recovery process to rebuild the chains according to an order of which operations associated with the key-value record pairs were executed.

12. The system of claim 11, wherein the storage management system is further configured to:

in response to detecting the failure, rebuild a key-value map data structure associating keys and values with corresponding key-value metadata of indexing information.

13. The system of claim 11, wherein the persistent key-value store and a non-volatile log (NVlog) are stored within a non-volatile random access memory (NVRAM), and wherein the system comprises space management functionality configured to:

provide the NVlog with metrics associated with NVRAM utilization by the persistent key-value store, wherein the metrics are used to determine when to store data from the NVlog to storage; and provide the persistent key-value store with metrics associated with NVRAM utilization by the NVlog.

14. The system of claim 11, wherein the storage management system is further configured to:

in response to detecting the failure, perform the journal recovery process to rebuild active chains of the persistent key-value store according to an order of which operations associated with the key-value record pairs were executed and to rebuild frozen chains in any order, wherein an active chain is available to store new key-value record pairs, and wherein a frozen chain is no longer available to store new key-value record pairs and key-value record pairs within the frozen chain set to be distributed to distributed storage.

15. The system of claim 11, wherein the storage management system is further configured to:

store key-value pairs for a first service within a first set of chains and key-value pairs for a second service within a second set of chains; and in response to detecting the failure, independently recovery the first set of chains for the first service and the second set of chains for the second service.

16. A method, comprising:

storing a key-value record pair within a chain in a persistent key-value store, wherein a chain includes an operation header bucket for recording key entries of key records and metadata of the key records, a data bucket for recording value entries of value records, and a meta bucket for recording bucket chain metadata pointing to the operation header bucket that points to the data bucket; and in response to detecting a failure associated with a distributed cluster of nodes, performing a journal recovery process to rebuild the chains, including operation header buckets, data buckets, and meta buckets, of the persistent key-value store according to an order of which operations associated with the key-value record pairs were executed.

17. The method of claim 16, further comprising:

storing key-value pairs for a first service within a first set of chains and key-value pairs for a second service within a second set of chains; and in response to detecting the failure, independently recovering the first set of chains for the first service and the second set of chains for the second service.

18. The method of claim 16, further comprising:

directing write operations to active chains within the persistent key-value store; and directing read operations to the active chains and frozen chains within the persistent key-value store.

19. The method of claim 18, further comprising:

in response to an active chain reaching a threshold size or a consistency point being reached, freezing the active chain as a frozen chain and persist data within the frozen chain across distributed storage.

20. The method of claim 16, further comprising:

in response to an active chain reaching a threshold size, freezing the active chain as a frozen chain and persist data within the frozen chain across distributed storage; and in response to the data being persisted across the distributed storage, freeing a frozen operation header bucket, a frozen meta bucket, and a frozen data bucket of the frozen chain.

* * * * *